US007953688B2

(12) United States Patent
Sadeh

(10) Patent No.: US 7,953,688 B2
(45) Date of Patent: May 31, 2011

(54) METHOD AND SYSTEM FOR FACILITATING A COMPLIANCE AUDIT USING A RULE SET

(76) Inventor: Sharon Sadeh, London (GB)

(*) Notice: Subject to any disclaimer, the term of this patent is extended or adjusted under 35 U.S.C. 154(b) by 879 days.

(21) Appl. No.: 11/934,552

(22) Filed: Nov. 2, 2007

(65) Prior Publication Data
US 2008/0281768 A1 Nov. 13, 2008

Related U.S. Application Data

(60) Provisional application No. 60/916,770, filed on May 8, 2007.

(51) Int. Cl.
G06N 5/02 (2006.01)
G06F 15/173 (2006.01)
G06F 9/45 (2006.01)

(52) U.S. Cl. .......................................... 706/47; 709/223
(58) Field of Classification Search .................... 706/47; 709/223; 705/3, 11
See application file for complete search history.

(56) References Cited

U.S. PATENT DOCUMENTS

| | | | |
|---|---|---|---|
| 6,049,794 A | 4/2000 | Jacobs et al. | |
| 6,314,415 B1 | 11/2001 | Mukherjee | |
| 6,850,923 B1 | 2/2005 | Nakisa et al. | |
| 7,072,895 B2 | 7/2006 | Mamorsky | |
| 7,734,481 B1* | 6/2010 | Hutton et al. | 705/3 |
| 2003/0217036 A1 | 11/2003 | Haunschild et al. | |
| 2004/0139053 A1 | 7/2004 | Haunschild | |
| 2004/0177326 A1 | 9/2004 | Bibko et al. | |
| 2005/0066021 A1* | 3/2005 | Megley | 709/223 |
| 2005/0071185 A1 | 3/2005 | Thompson | |
| 2005/0091067 A1 | 4/2005 | Johnson | |
| 2005/0131784 A1 | 6/2005 | Mamorsky | |
| 2005/0228685 A1 | 10/2005 | Schuster et al. | |
| 2005/0228688 A1 | 10/2005 | Visser et al. | |
| 2005/0288994 A1* | 12/2005 | Haunschild | 705/11 |
| 2006/0010049 A1 | 1/2006 | Sunde | |
| 2006/0288005 A1 | 12/2006 | Mamorsky | |
| 2007/0130191 A1 | 6/2007 | Dawson | |

FOREIGN PATENT DOCUMENTS

| | | |
|---|---|---|
| AU | 200062088 B2 | 4/2001 |
| WO | WO 02/31707 A1 | 4/2002 |
| WO | WO 03/058523 A1 | 7/2003 |
| WO | WO 2006/036991 A2 | 4/2006 |
| WO | WO 2007/036991 A3 | 3/2007 |
| WO | WO2007/061649 A2 | 5/2007 |

OTHER PUBLICATIONS

Graham, Ian, "Service Oriented Business Rules Management Systems," Jun. 6, 2005, 75 pp., Trireme International Ltd., Stockport SK4 1BS, England, United Kingdom.

* cited by examiner

Primary Examiner — Jeffrey A Gaffin
Assistant Examiner — Ola Olude-Afolabi
(74) Attorney, Agent, or Firm — Chowdhury & Georgakis, P.C.

(57) ABSTRACT

In an embodiment of the invention, a method related to conducting a compliance audit, including accessing a database, the database including a rule set formulated from at least one requirement, wherein the database includes a knowledge base, accepting input regarding circumstance data, the circumstance data regarding a subject of the at least one requirement, applying the rule set to the input regarding circumstance data, and generating a compliance audit report based on applying the rule set to the input regarding circumstance data. In addition, other method, system, program product, and apparatus aspects are described in the claims, drawings, or text forming a part of the present disclosure.

31 Claims, 29 Drawing Sheets

METHOD AND SYSTEM FOR FACILITATING A COMPLIANCE AUDIT USING A RULE SET

The application claims priority under 35 USC §119(e)(1) of Provisional Application No. 60/916,770, filed May 8, 2007, incorporated herein by reference.

TECHNICAL FIELD OF THE INVENTION

The present disclosure relates generally to conducting a compliance audit.

BACKGROUND OF THE INVENTION

The cost of compliance with laws, regulations, standards, and rules is a burden on businesses. As various industries and businesses and jurisdictions such as states, nations, and supranational organizations (for example, the European Union (the "EU")), adopt more and more such requirements, business compliance costs, as well as risks in the form of trade restrictions, fines, and criminal penalties, increase. These increasing costs and risks have an effect not only on the costs of doing business but on costs in commerce as businesses avoid such risks by refraining from regulated activities or by refraining from discussing legal rules with the relevant authorities. This situation has created a need for timely and accurate compliance audits to determine the specific requirements imposed by such laws, regulations, standards, and rules.

SUMMARY OF THE INVENTION

In some embodiments of the invention, a method related to conducting a compliance audit includes but is not limited to accessing a database, the database including a rule set formulated from at least one requirement, wherein the database includes a knowledge base; accepting input regarding circumstance data, the circumstance data regarding a subject of the at least one requirement; applying the rule set to the input regarding circumstance data and generating a compliance audit report based on applying the rule set to the input regarding circumstance data. In addition to the foregoing, other method aspects are described in the claims, drawings, and text forming a part of the present disclosure.

In some embodiments of the invention, a system related to conducting a compliance audit includes but is not limited to circuitry configurable for accessing a database, the database including a rule set formulated from at least one requirement, wherein the database includes a knowledge base; circuitry configurable for accepting input regarding circumstance data, the circumstance data regarding a subject of the at least one requirement; circuitry configurable for applying the rule set to the input regarding circumstance data; and circuitry configurable for generating a compliance audit report based on applying the rule set to the input regarding circumstance data. In addition to the foregoing, other system aspects are described in the claims, drawings, and text forming a part of the present disclosure.

In some embodiments of the invention, related articles, systems, and devices include but are not limited to circuitry, programming, electro-mechanical devices, and optical devices for effecting the herein-referenced method aspects. The circuitry, programming, electro-mechanical devices, and optical devices can be virtually any combination of hardware, software, and firmware configured to effect the herein-referenced embodiments depending upon the design choices of an electronics designer.

In some embodiments of the invention, an article comprising a medium storing instructions that, if executed by a processor-based system, enable the processor-based system to access a database, the database including a rule set formulated from at least one requirement, wherein the database includes a knowledge base; accept input regarding circumstance data, the circumstance data regarding a subject of the at least one requirement; apply the rule set to the input regarding circumstance data; and generate a compliance audit report based on applying the rule set to the input regarding circumstance data.

In some embodiments of the invention, a system related to conducting a compliance audit includes but is not limited to at least one first processor and at least one first memory operably coupleable to the at least one first processor, the first processor and the first memory operable to access a database, wherein the database includes a knowledge base, the knowledge base including a rule set, the rule set including rules formulated from at least one requirement; an interface operable to accept input regarding circumstance data, the interface for accepting input regarding circumstance data operably coupleable to the at least one first processor and to the at least one first memory, the circumstance data regarding a subject of the at least one requirement; at least one second processor and at least one second memory, the at least one second processor operably coupleable to the interface for accepting input regarding circumstance data, the at least one second processor and the at least one second memory operable to apply the rule set to the input regarding circumstance data; and at least one third processor and at least one third memory, the at least one third processor and at least one third memory operable to generate a compliance audit, the at least one third processor and the at least one third memory operably coupleable to the at least one second processor for applying the rule set to the input regarding circumstance data, the compliance audit based on an application of the rule set to the input regarding circumstance data. In addition to the foregoing, other apparatus aspects are described in the claims, drawings, and text forming a part of the present disclosure.

In addition to the foregoing, various other method, system, program product, and apparatus aspects are set forth and described in the teachings such as the text (e.g., claims and detailed description) and drawings of the present disclosure.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of the devices, processes, and other subject matter described herein will become apparent in the teachings set forth herein.

BRIEF DESCRIPTION OF THE DRAWINGS

FIG. 10 shows an exemplary screenshot of a Web browser interface for accepting input regarding circumstance data, specifically an affirmation of a specific choice, in accordance with some embodiments of the invention;

FIG. 13 shows an exemplary screenshot of a Web browser interface for acceptance of input regarding circumstance data, specifically a list of options, in accordance with some embodiments of the invention;

FIG. 15 shows an exemplary screenshot of a Web browser interface for presentation of compliance audit information, specifically a reference to a specific law that is relevant to the party seeking a compliance audit, in accordance with some embodiments of the invention;

FIG. 23 shows an exemplary screenshot of a Web browser interface for acceptance of input regarding circumstance data, specifically a list of options, in accordance with some embodiments of the invention;

FIG. 24 shows an exemplary screenshot of a Web browser interface for acceptance of input regarding circumstance data, specifically selection of a specific option, in accordance with some embodiments of the invention;

FIG. 25 shows an exemplary screenshot of a Web browser interface for presentation of compliance audit information, specifically a reference to a specific law that is relevant to the party seeking a compliance audit, in accordance with some embodiments of the invention;

FIG. 26 shows an exemplary screenshot of a Web browser interface for presentation of compliance audit information, specifically text of a particular law that is relevant to the party seeking a compliance audit, in accordance with some embodiments of the invention;

The use of the same symbols in different drawings typically indicates similar or identical items.

NOTATION AND NOMENCLATURE

Figure 1:
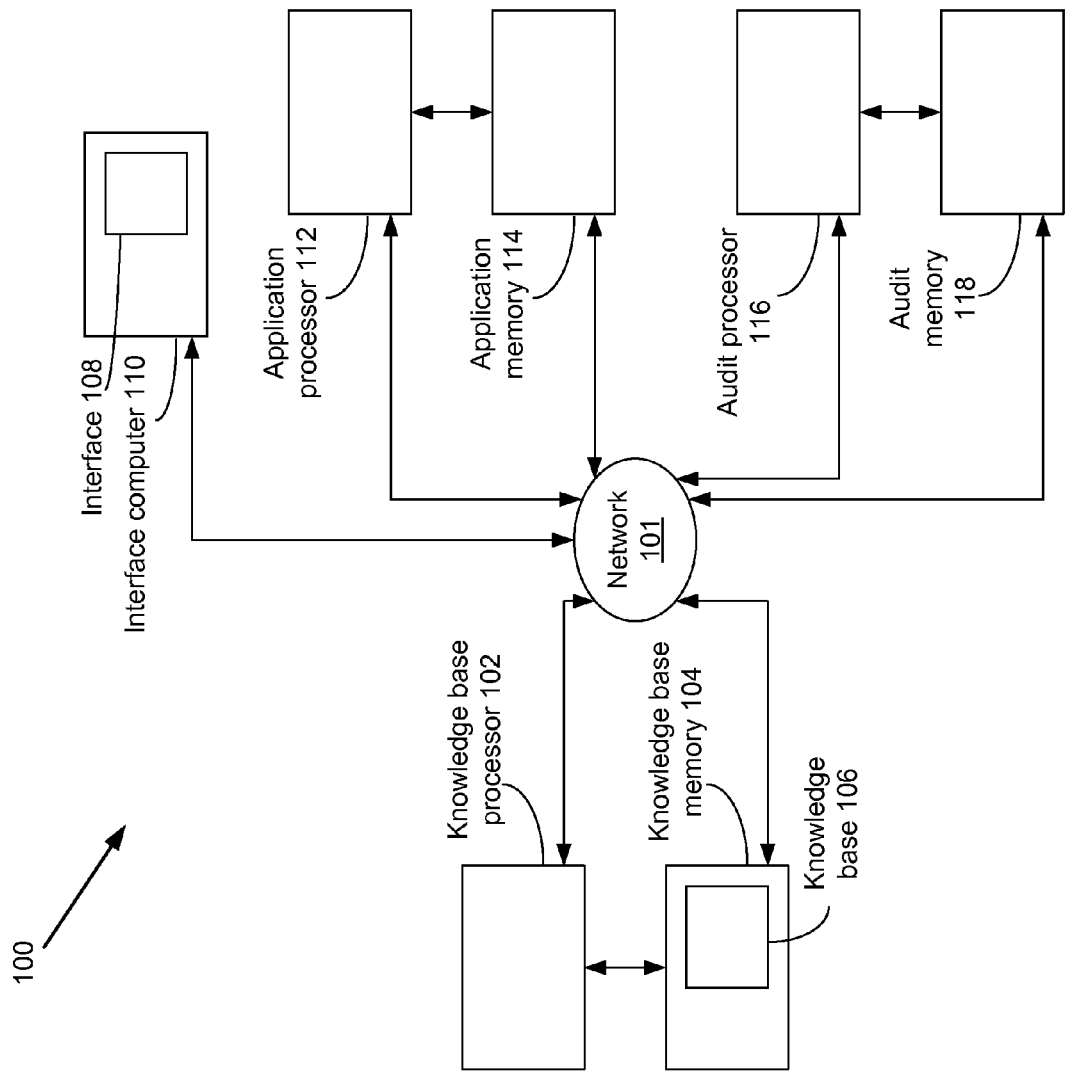
FIG. 1 shows an exemplary computing and communications environment in which the methods and systems herein may be represented.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also the terms "couple," "couples," and "coupleable" are intended to mean either an indirect or a direct electrical or wireless connection. Thus, if a first device couples to a second device, that connection may be through a direct electrical or wireless connection, or through an indirect electrical or wireless connection via other devices and connections.

DETAILED DESCRIPTION OF PREFERRED EMBODIMENTS

Embodiments that generate or make possible a generation of systematic reviews or assessments of rule-based requirements that are applicable to activities or products of an industry, commercial concern, or professional practice in a variety of circumstances are described. Herein, such systematic reviews or assessments are referred to as "compliance audits." A compliance audit may make use of specific information about an activity or product of interest to assist in determining specific applicable rules. Generation of a compliance audit may include but not be limited to (1) performing a review or assessment of requirements, (2) providing a report of results of such review or assessment, or (3) both the review performance of (1) and the report provision of (2). The embodiments are applicable to a variety of decision-making contexts and geographic locations and can use various languages. The embodiments may be used in such industries as textiles, electronics, chemical, medical diagnostic equipment, rubber and plastic products, construction, electrical and optical equipment, and, further, may be used to assist the work of practitioners and service providers in the areas of financial services, building and leisure services, among others. Such embodiments may be used in many markets such as Europe (within the context of the EU supranational level as well as the member states level), North America and Asia. The circumstances in which the embodiments may be applicable include but are not limited to product performance, taxation, social aspects, safety, environmental rules, and labeling, packing, and packaging issues. Product performance may include but not be limited to the methods or means by which a product performs the function for which it is designed. Social aspects, which refer to the social effects of a service or product as it is implemented, may include but not be limited to measures to encourage improvements in the safety and health of workers at work, measures to prevent child labor practices, and aspects of the organization of working time.

As used herein, the term "compliance audit" includes but is not limited to an audit to assess compliance with requirements including provisions of (a) regulations, including statutory and administrative rules, (b) standards, including industry codes, for the manufacture, testing, and sale, or use of subject items, and (c) private rules or standards set by private entities such as companies that buy products for use or resale. Standards such as industry codes include but are not limited to standards relating to, for example, textiles and textile products. Private rules or standards set by private entities include but are not limited to, for example, products and materials such as a hotel chain's private rules and standards for mattresses to be used in its hotels. Use of embodiments may reduce costs and risks associated with compliance with such requirements. Use of embodiments may reduce such costs and risks by providing quick, reliable compliance guidance when entering a market such as the EU market. Such guidance may help avoid or reduce costs such as fines and loss of reputation as a result of legal actions by enforcement agencies. Such guidance may also help avoid or reduce costs such as time-to-market costs incurred from product conception to actual sales by providing information about banned or illegal substances and tests required to ensure conformity to standards. In addition, such guidance may also help avoid or reduce translation costs by permitting use in more than one language, such as more than one of the official languages of the EU.

Further, some embodiments provide reproducible, up-to-date, and easily transferable expertise that may be accessible from a variety of locations by means of, for example, the Internet. Some embodiments allow a reduction of dependence on human experts such as lawyers, consultants, and other practitioners who may need to understand not only an ever-changing regulatory environment but also the functions and specifications of specific products and services, all of which are time-consuming to read and understand. Such reduction of dependence on human experts may be achieved by giving end-users access to up-to-date information from various sources including experts, news, and information monitoring services.

In addition, some embodiments may allow some end-users to add their own business rules to a proprietary knowledge base, after appropriate training in writing business rules. The term "business rule" includes a compact statement about an aspect of a business that can be expressed in terms that can be directly related to the business. A business rule typically uses simple, unambiguous language that is accessible to business owners, business analysts, technical architects, and other parties.

Some embodiments of the invention may include implementations involving artificial intelligence systems such as expert systems. Some embodiments of the invention may further include rules having various structures, such as IF-THEN structures or IF-THEN-ELSE structures, and may incorporate fuzzy logic, making use of estimates of uncertainty in particular circumstances. Artificial intelligence systems such as expert systems are described in a large variety of technical publications such as textbooks. An exemplary textbook that describes expert systems is Joseph C. Giarratano and Gary D. Riley, *Expert Systems: Principles and Programming*, $4^{th}$ ed., Thomson Course Technology, Boston, Mass., 2004. An exemplary work that describes aspects of applications having to do with business rules is Ian Graham, *Business Rules Management and Service Oriented Architecture: A Pattern Language*, Wiley, London, 2007.

Referring to FIG. 1, an exemplary embodiment 100 in which some aspects of the invention may be implemented is illustrated. In the exemplary embodiment 100, a compliance audit may be conducted. The exemplary embodiment 100 shows a system in which operable couplability among the various components is provided at least in part via the Internet, represented in FIG. 1 by the network 101. Operable couplability among the various components may also be provided at least in part via a wide area network or a local network, also represented in FIG. 1 by the network 101. A local network may include a local area network such as an Ethernet local area network.

The exemplary embodiment 100 includes at least one knowledge base processor, represented in FIG. 1 by a single knowledge base processor 102, and at least one knowledge base memory, represented in FIG. 1 by a single knowledge base memory 104, that is operably coupleable to the knowledge base processor 102. The knowledge base processor 102 and the knowledge base memory 104 are operable to access a knowledge base 106, a data structure that includes at least one logic business rule formulated from at least one requirement. The knowledge base 106 may also include one or more items of data required to perform a compliance audit, including but not limited to data that represents input regarding circumstance data. The knowledge base 106 is shown stored in the knowledge base memory 104.

Herein, a "logic business rule" may also be referred to as a "business rule". The logic business rule inputs may represent one or more logic business rules for one or more nodes in one or more decision trees. The one or more logic business rule inputs may include inputs for construction of the one or more decision trees. Logic business rules include but are not limited to two categories of rules: navigation rules and result rules. Navigation rules are logic business rules that determine which question or questions are to be presented at each step of a compliance audit process. The navigation rules determine which question or questions are applicable, e.g., given the inputs accepted, and whether a given question or questions must be presented, e.g., mandatory questions given the inputs accepted. Where rules are incorporated in a decision tree, every layer in the decision tree preferably activates a different rule group to avoid collisions, contradictions, or missing links. Result rules typically appear at the end of a sequence of presented questions and include without being limited to two types of logic business rules, result group rules and legislative group rules. A result group rule determines the last question or questions that are to be presented. A legislative group rule determines one or more references to requirements that are to be presented as a result of a compliance audit. Such a reference may include a hyperlink or other means or obtaining a document, e.g., a file or a Web page associated with the reference, e.g., a text of a statute in connection with a reference to the statute. (In some embodiments, a functionality that permits an end-user to trace a reference to a relevant requirement may be used to connect to an associated text.)

The knowledge base 106 includes a rule set, which may include one or more logic business rule inputs accepted via a knowledge base user interface from one or more actors. The one or more actors may include a human actor or a software system or both. The one or more actors may also include lawyers and other practitioners in a regulatory or technical standard field of interest, technical experts in the regulatory or technical standard field ("knowledge engineers"), or rule-writing experts ("rule experts"). A knowledge engineer may be an expert on requirements such as statutes, may have rule-writing knowledge, and may perform a number of activities including but not limited to composing business rules based on the texts of requirements, both initially and as the source material changes over time. A rule expert may be a knowledge engineer and may perform a number of activities including but not limited to writing rule templates; writing decision trees based on knowledge gleaned from the source material including regulations, standards, and rules requiring compliance; assisting knowledge engineers in their tasks; building initial data dictionaries, and updating rule templates, decision trees, and data dictionaries as required over time.

The knowledge base processor 102 may include, for instance, one or more processors in one or more commonly available computers. The knowledge base processor 102 may be the INTEL® PENTIUM® processor, the Hewlett-Packard® PA-RISC® processor, or the IBM® POWERPC® processor. The knowledge base memory 104 may include, for instance, a memory in a commonly available computer. The knowledge base memory 104 may include, for example, the KINGSTON TECHNOLOGY® HyperX® 2GB double-data-rate two ("DDR2") 1000 MHz PC2-8000 dual in-line memory module ("DIMM") or the INFINEON® 2GB DDR2 533 MHz PC2-4200 DIMM.

The exemplary embodiment 100 further includes an interface 108 operable to accept input regarding circumstance data. The interface 108 may be, for example, a graphical user interface displayed on a display screen of such a Hewlett-Packard® laptop computer, along with a keyboard or a mouse, or a combination of a keyboard and a mouse, operably coupleable to the Hewlett-Packard® laptop computer. The interface 108 is illustrated in FIG. 1 as a feature of the interface computer 110 and is operably coupleable to the at least knowledge base processor 102 and the at least one knowledge base memory 104. The input regarding circumstance data includes data regarding a subject of at least one regulatory or technical standard provision.

One or more end-users (not shown in FIG. 1) interact with the knowledge base 106 to receive guidance on compliance in the regulated field via the interface 108. The one or more end-users may include a human actor or a software system or both. An end-user may also be a knowledge expert or a rule expert or may be trained to act as a knowledge expert or a rule expert to create or modify the knowledge base 106. One or more questions or prompts may be presented via the interface 108, which may also accept answers to the one or more questions from the one or more end-users. More than one question or prompt may be presented at a time. The interface 108 may be a feature of an interface computer 110. The interface computer 110 may be, for example, a commonly available computer such as a Hewlett-Packard® laptop computer, a DELL® desktop computer, or a Sun® workstation.

Continuing reference to FIG. 1, the exemplary embodiment 100 also includes at least one application processor, represented in FIG. 1 by a single application processor 112, and at least one application processor, represented in FIG. 1 by a single application memory 114. The application processor 112 and the application memory 114 are both operably coupleable to the knowledge base processor 102. The application processor 112 and the application memory 114 are operable to apply the rule set to the input regarding circumstance data. Herein, the application processor 112 may also be referred to as an "inference engine processor." The application memory 114 may also be referred to herein as an "inference engine memory." An "inference engine" may include the application processor 112 and the application memory 114. Herein, the application processor 112 may also be referred to as a "rule engine processor." The application memory 114 may also be referred to as a "rule engine memory." A "rule engine" may include the application processor 112 and the application memory 114. The application processor 112 may include, for example, one or more processors in one or more commonly available computers, such as the AMD SEMPRON® processor or the Dual Core INTEL® XEON® processor. The application memory 114 may include, for instance, a memory in a commonly available computer such as the CORSAIR® 2GB DDR2 1066 MHz PC2-8500 DIMM or the MICRON® 512MB DDR2 533 MHz PC2-4200 DIMM.

The exemplary embodiment 100 further includes at least one audit processor, represented in FIG. 1 as a single audit processor 116, and at least one audit memory, represented in FIG. 1 as a single audit memory 118. The audit processor 116 and the audit memory 118 are operable to generate a compliance audit based on application of the rule set to the input regarding circumstance data. The audit processor 116 may include, for instance, one or more processors in one or more commonly available computers, such as the INTEL® CELERON® processor or the AMD OPTERON® processor. The audit memory 118 may include, for instance, a memory in a commonly available computer such as the OCZ® 2GB DDR2 1000 MHz PC2-8000 DIMM or the SAMSUNG® 2GB DDR2 667 MHz PC2-5300 DIMM.

The application processor 112, the application memory 114, audit processor 116, or the audit memory 118 shown in FIG. 1 may include hardware, software, or firmware, or some combination of one or more of such hardware, software, and firmware, operable to provide alerts to the interface 108. Such alerts may provide information about a change (e.g., a change that has occurred or a change that is to occur in the future) to a regulatory or technical standard provision of interest to one or more end-users. Some embodiments of the invention may include but not be limited to, for example, storing a record of a reference to one or more regulatory or technical standard provisions that are included in a compliance audit generated for an end-user; and further, accepting input data representing a notice that those one or more regulatory or technical standard provisions have changed or are to be changed in the future. Continuing with this example, an alert including such a notice may be presented via the interface 108, so that the end-user may be informed of the changes or prospective changes. Similarly, some embodiments of the invention may include, for example, storing a record of references to one or more other regulatory or technical standard provisions that are indexed as related to those one or more regulatory or technical standard provisions referenced in a compliance audit, or one or more other regulatory or technical standard provisions for which a record has been stored indicating an end-user's interest; accepting input data representing a notice that those one or more other regulatory or technical standard provisions have changed or are to be changed in the future; and presenting an alert including such a notice via the interface 108. One skilled in the art will recognize that the foregoing example represents only several of many possible implementations of some embodiments of the invention.

Further, the application processor 112, the application memory 114, audit processor 116, or the audit memory 118 shown in FIG. 1 may include hardware, software, or firmware, or some combination of one or more of such hardware, software, and firmware, operable to provide responses to query inputs received via the interface 108, where the responses provide information about a regulatory or technical standard provision of interest to one or more end-users. Such information may include, e.g., a history of a regulatory or technical standard provision of interest, or an alert about a change (e.g., a change that has occurred or a change that is to occur in the future) to a regulatory or technical standard provision of interest. Some embodiments of the invention may include but not be limited to, for example, accepting input via interface 108 data representing a query from an end-user, where the query requests information about a regulatory or technical standard provision of interest. Continuing with this example, input data representing, e.g., a history of a regulatory or technical standard provision of interest, or an alert about a change to a regulatory or technical standard provision of interest, may be accepted, and, upon input and processing of the data representing the query, data representing information about a regulatory or technical standard provision of interest may be presented via interface 108. One skilled in the art will recognize that the foregoing example represents only several of many possible implementations of some embodiments of the invention.

In addition, the application processor 112, the application memory 114, audit processor 116, or the audit memory 118 shown in FIG. 1 may include hardware, software, or firmware, or some combination of one or more of such hardware, software, and firmware, operable to provide links or other contact information to the interface 108 for use in contacting an entity that makes items such as regulatory or technical standards provisions available for purchase (such as BSI British Standards or the European Committee for Standardization (Comité Européen de Normalisation, or "CEN")) by interested parties such as one or more end-users. Such an entity may include, for example, a business or a trade organization or a government entity that sells copies of statutes, regulations, technical standards, etc. The hardware, software, or firmware, or some combination of one or more of such hardware, software, and firmware, operable to provide links or other contact information may do so in conjunction with, for instance, generating a compliance audit that includes a reference to a particular regulation or technical standard provision. Some embodiments of the invention may include but not be limited to, for example, accepting and storing input data representing the identity, contact information, or sales information, or some combination of one or more of those items, of an entity that sells copies of statutes, regulations, and technical standards, such as a link to a seller's Web site; storing a record of a regulatory or technical standard provision of interest to an end-user (e.g., a regulatory or technical standard provision referenced in a compliance audit generated for an end-user, or a regulatory or technical standard provision about which a query for information is accepted via the interface 108); and presenting via the interface 108 the stored input data representing the identity, contact information, or sales information, or some combination of one or more of those items, of the selling entity where the selling entity is selling a copy of a regulatory or technical standard provision of interest to the end-user. One skilled in the art will recognize that the foregoing example represents only one of many possible implementations of some embodiments of the invention.

Also, the application processor 112, the application memory 114, audit processor 116, or the audit memory 118 shown in FIG. 1 may include hardware, software, or firmware, or some combination of one or more of such hardware, software, and firmware, operable to provide links or other contact information to the interface 108 for use in contacting an entity that performs compliance tests or product evaluations, such as accredited laboratories in the end-user's country, in ways analogous to the ways described herein with respect to provision of links or other contact information to the interface 108 for use in contacting an entity that makes items such as regulatory or technical standards provisions available for purchase by interested parties such as one or more end-users. One skilled in the art will recognize that the foregoing example represents only one of many possible implementations of some embodiments of the invention.

The knowledge base processor 102, the application processor 112, and the audit processor 116 shown in FIG. 1 may be the same processor, or the same set of processors in whole or in part. That is, a single processor or set of processors may serve as the knowledge base processor 102, the application processor 112, and the audit processor 116, or each of the knowledge base processor 102, the application processor 112, and the audit processor 116, may be distributed over a number of processors or sets of processors such that they may or may not overlap. Part or all of each of the knowledge base processor 102, the application processor 112, and the audit processor 116 may be included in the interface computer 110. Similarly, a single memory resource or set of memory resources may serve as the knowledge base memory 104, the application memory 114, and the audit memory 118 shown in FIG. 1 may be the same memory resource, or each of the knowledge base memory 104, the application memory 114, and the audit memory 118 may be distributed over a number of memory resources or sets of memory resources such that they may or may not overlap. Part or all of each of knowledge base memory 104, the application memory 114, and the audit memory 118 may be included in the interface computer 110.

Continuing to refer to FIG. 1, the embodiments represented by the exemplary embodiment 100 include an Internet-based embodiment in which an end-user uses the interface 108 and the interface computer 110 to access the knowledge base 106, the knowledge base processor 102, the knowledge base memory 104, the application processor 112, the application memory 114, the audit processor 116, and the audit memory 118 via the Internet (represented in FIG. 1 by the network 101). In this embodiment, the end-user uses a compliance audit services vendor's Web site. The compliance audit services vendor may include an entity such as an individual, group of people, or a business organization that provides compliance audits or means to conduct compliance audits.

Figure 2:
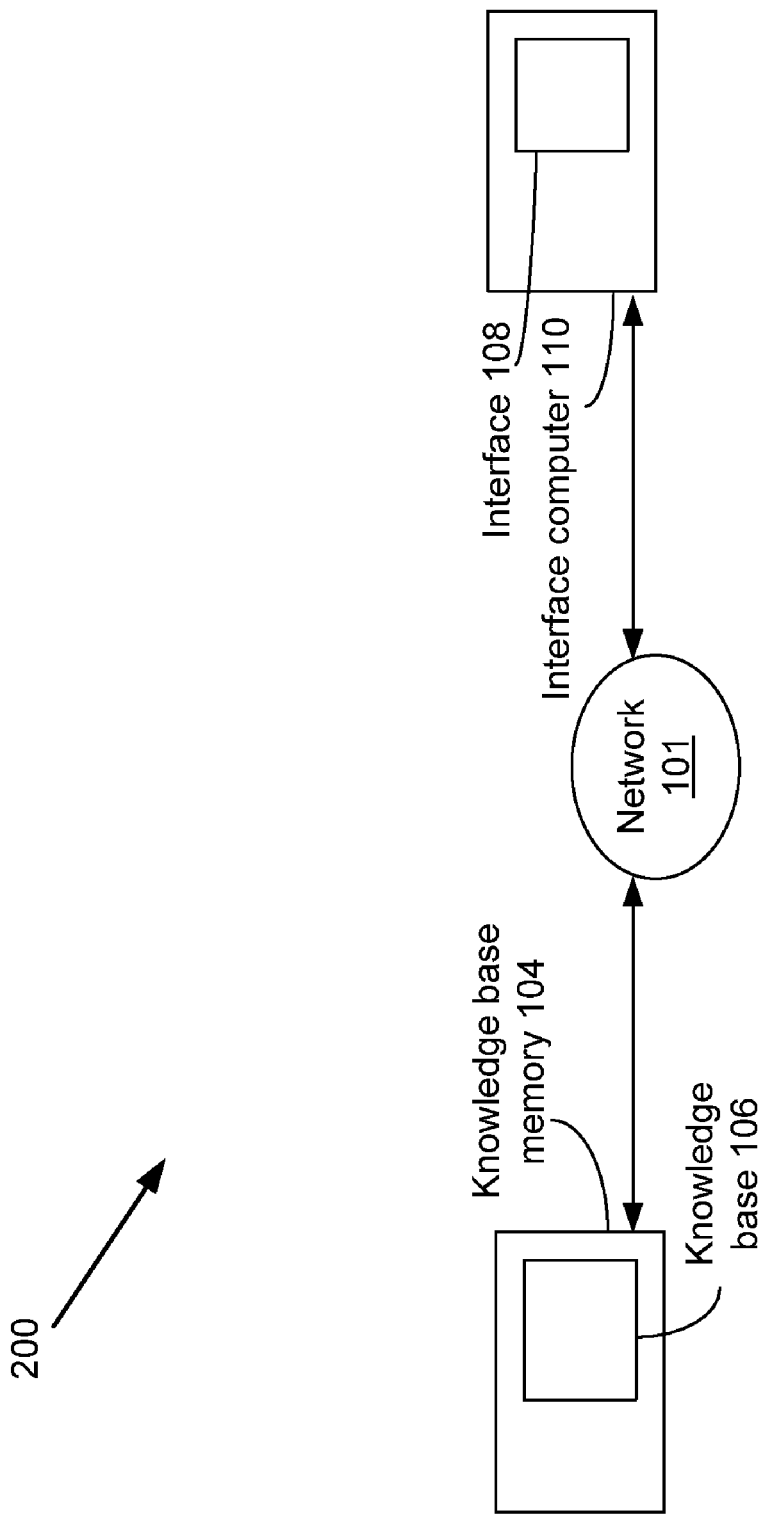
FIG. 2 shows an exemplary computing and communications environment in which the methods and systems herein may be represented.

Turning now to FIG. 2, an exemplary embodiment 200 in which some aspects of the invention may be implemented is illustrated. In the exemplary embodiment 200, a compliance audit may be conducted. In the exemplary embodiment 200, the interface 108 and the interface computer 110 introduced in FIG. 1 may be used to accept input for the knowledge base 106 stored in the knowledge base memory 104, also introduced in FIG. 1, as well as input regarding circumstance data. The interface 108 and the interface computer 110 of FIG. 1 may be, for example, a graphical user interface displayed on a display screen of a Dell® desktop computer, along with a keyboard or a mouse, or a combination of a keyboard and a mouse, operably coupleable to the Dell® desktop computer. In the exemplary embodiment 200, the interface computer 110 may include at least one of the knowledge base processors represented by the knowledge base processor 102. In the exemplary embodiment 200, the interface computer 110 may also include at least one of the application processors represented by the application processor 112, and at least one of the at least one application memory represented by the application memory 114, at least one of the audit processors represented by the audit processor 116, and at least one of the at least one audit memory represented by the audit memory 118.

Thus, in the exemplary embodiment 200, the interface 108 and the interface computer 110 together may be used by an end-user, a knowledge expert or a rule expert, which collectively may be one or more human users or one or more software systems or a combination of both, to accept input for the knowledge base 106, to accept input regarding circumstance data, to apply the rule set to the input regarding circumstance data, and to generate a compliance audit. Further, in the exemplary embodiment 200, the interface computer 110 may also include at least one of the at least one knowledge base memory represented by the knowledge base memory 104. Thus, the interface computer 110 may store part or all of the knowledge base 106.

Continuing to refer to FIG. 2, among the embodiments represented by the exemplary embodiment 200 are an embodiment in which the knowledge base 106 introduced in FIG. 1 resides in part or wholly on a desktop or laptop computer that may be operably coupleable to the Internet (in FIG. 1, represented by network 101), via which the desktop or laptop computer may obtain updates to the knowledge base 106, also introduced in FIG. 1. In this embodiment, the application processor 112, the application memory 114, the audit processor 116, and the audit memory 118 introduced in FIG. 1 are included in the desktop or laptop computer.

Figure 3:
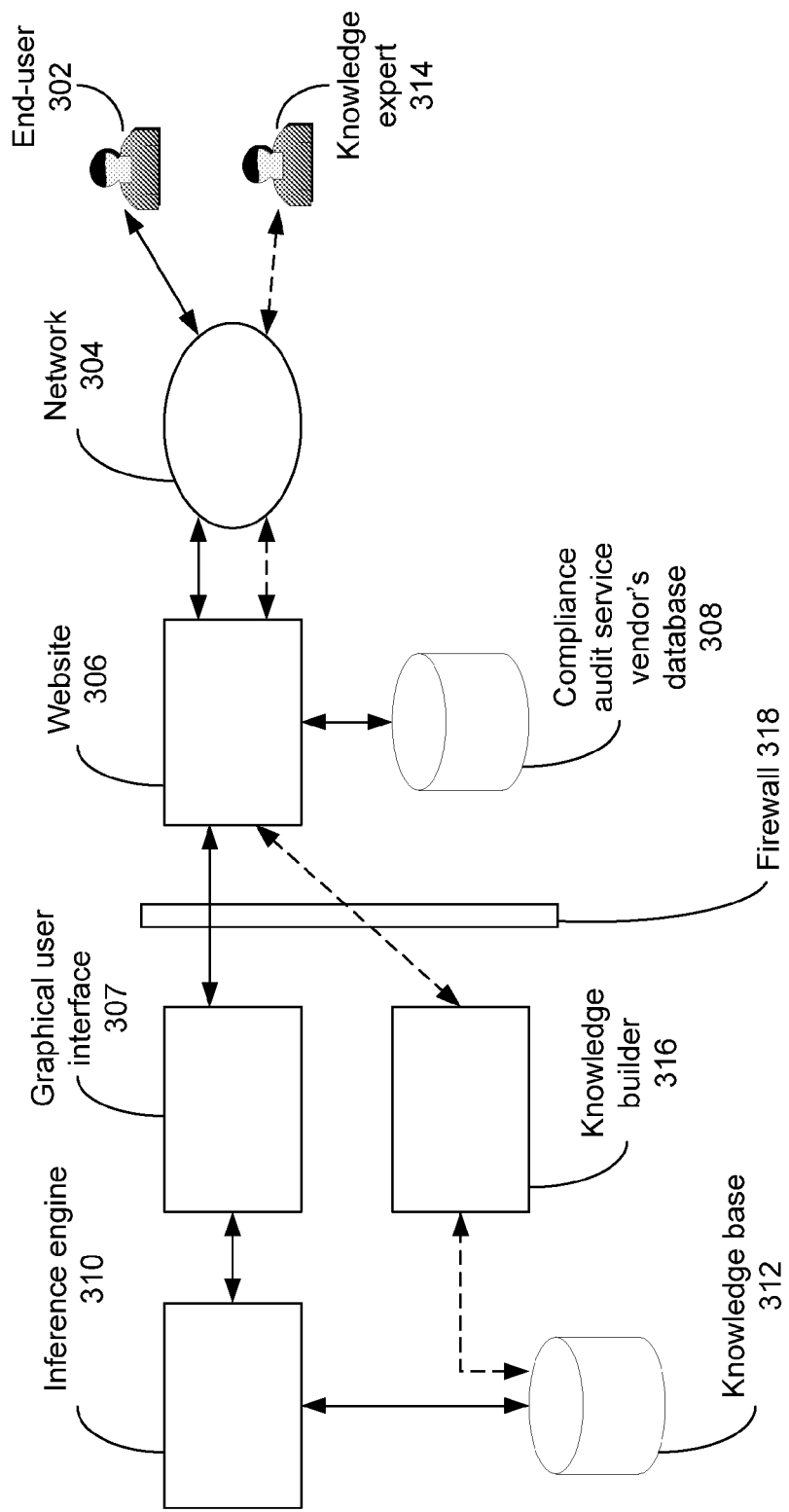
FIG. 3 shows an exemplary computing and communications environment in which the methods and systems herein may be represented.

Turning now to FIG. 3, an exemplary system implementation 300 in which some aspects of a system for conducting a compliance audit is shown. In this exemplary system implementation 300, the system for conducting a compliance audit is available to an end-user 302 via the Internet, represented in FIG. 3 by the network 304. Specifically, the system is made available via the Web site 306 of the compliance audit service vendor; that is, when an end-user 302 wants to use the exemplary system implementation 300, the end-user 302 directs a Web browser to the Web site of the compliance audit service vendor. The Web site 306 provides access to a graphical user interface 307 by which the end-user 302 uses the compliance audit service. Using the graphical user interface 307 of the Web site 306, the end-user 302 may access the compliance audit service vendor's database 308, the database 308 including graphics, dynamic pages for the purposes of users log-in and payment processing, pictures, and documents. Using the graphical user interface 307 of the Web site 306, the end-user 302 may also access the inference engine 310, and via the inference engine 310, the knowledge base 312, stored in a suitable repository such as a computer memory, including rules and data for use in conducting a compliance audit.

In one exemplary use of the exemplary system implementation 300, the Web site 306 may be provided as a user interface display presenting data representing a set of one or more predetermined options. The Web site 306 may be used to receive a subset of one or more choices selected by a group of predetermined user-selectable options selected by the end-user 302. The Web site 306 provides an interface with the inference engine 310, and via the inference engine 310, the knowledge base 312. The inference engine 310 retrieves business rules associated with each of the choices selected by the end-user 302 from the knowledge base 312, compares the choices with the associated attributes of the business rules, and determines a result of a compliance audit, e.g., an appropriate compliance procedure. In this exemplary use, the exemplary system implementation 300 presents the result of the compliance audit to the end-user 302 via the Web site 306. Connections between the end-user 302, the network 304, the Web site 306, the graphical user interface 307, the compliance audit service vendor's database 308, the inference engine 310, and the knowledge base 312 that may be used by the end-user 302 are indicated by solid arrows in FIG. 3.

Continuing reference to FIG. 3, the exemplary system implementation 300 may also be used by a knowledge expert 314 via the Web site 306. The knowledge expert 314 may be a person separate from the end-user 302 or may be the same person as the end-user 302. When the knowledge expert 314 wants to access the exemplary compliance system 300, he may direct his Web browser to the Web site 306 via the network 304 (representing the Internet in FIG. 3). The Web site 306 provides a graphical user interface 307 by which the knowledge expert 314 accesses the knowledge builder 316 and, via the knowledge builder 316, with the knowledge base 312. The knowledge base 312 may include a rule engine. The knowledge expert 314 may use this access to the knowledge builder 316 and the knowledge base 312 to modify the knowledge base 312 to, for instance, update or refine the rules and data included therein. The knowledge expert 314 may also use the knowledge builder 316 to create a knowledge base 312. The exemplary system implementation 300 may provide access to the inference engine 310 and the knowledge builder 316 via security provisions such as a firewall 318 or a single sockets layer. Connections between the knowledge expert 314, the network 304, the Web site 306, the knowledge builder 316, and the knowledge base 312 that may be used by the knowledge expert 314 are indicated by dotted arrows in FIG. 3.

Typical uses of the exemplary compliance system 300 may include some or all of the following activities. First, experts, such as lawyers and experts in relevant fields, create one or more compliance manuals in which relevant regulations, standards, and rules requiring compliance, along with interpretations, public or private knowledge or both, are collected, using public or private (e.g., proprietary) knowledge. Using the one or more compliance manuals, source materials, or both, rule experts deduce relevant business rules from natural language texts. The rule experts may present those business rules in the form of decision trees. The process of deducing relevant business rules may include seeking feedback (e.g., clarification, additional information, or confirmation) from the experts who have created the one or more compliance manuals, experts on source materials, or holders of public or private knowledge. The business rules and relevant data are used by one or more knowledge experts 314 to create a knowledge base 312 or to modify an existing knowledge base 312, using the Web site 306 and the knowledge builder 316. The business rules and the relevant data of the knowledge base 312 may be checked against the source material as they are used and may be refined as required to represent more accurately and efficiently the source material. One or more end-users 302 interact with the knowledge base 312 via Web site 306 and the inference engine 310 to receive compliance audit reports and alerts about relevant regulations, standards, and rules. In this example, the alerts are based at least in part on a record of the queries of the one or more end-users 302. Such a record may indicate which topics and regulations, standards, and rules requiring compliance, along with interpretations or public or private knowledge, interest the one or more end-users 302.

Figure 4:
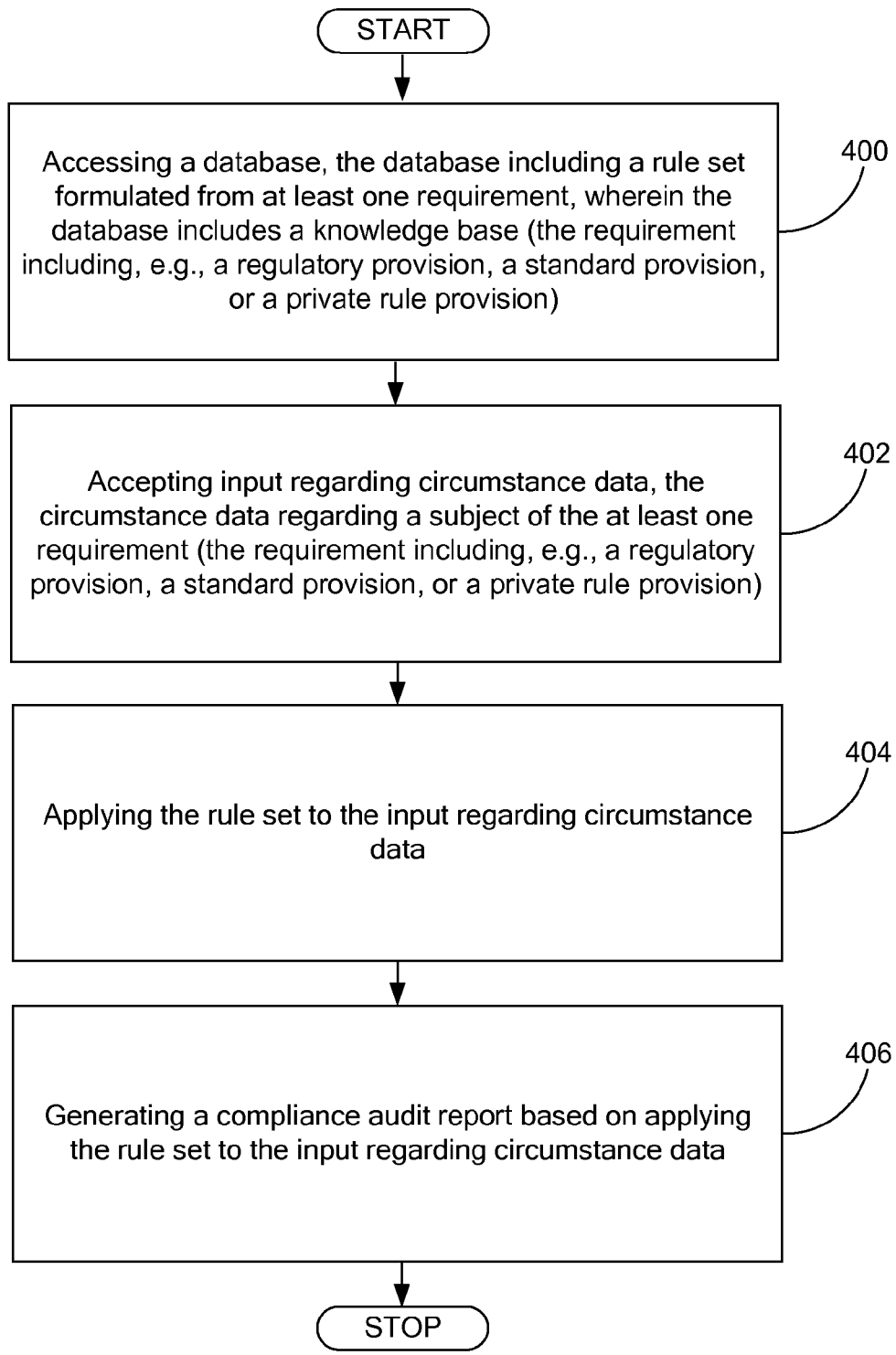
FIG. 4 shows a high-level logic flowchart of an operational process for conducting a compliance audit in accordance with some embodiments of the invention.

Referring now to FIG. 4, a method for conducting a compliance audit is shown. The method includes one or more of the following operations: 400, 402, 404, and 406. The method for conducting a compliance audit may include but is not limited to performing a compliance audit for a user in the context of a regulatory system restricting actions or materials in a particular context by means of legal provisions. For example, a buyer or seller may wish to import products using textiles, or textiles for use in products, into the EU for sale. The buyer or seller may further wish to investigate the applicable legal provisions of the EU for (1) the legal or technical standard provisions governing the use of a particular textile in furnishings or (2) the legal or technical standard provisions governing the use of any textiles used in a particular furnishing. The use of this example concerning textiles is not intended to be limiting. Those skilled in the art will recognize the more general applicability of embodiments of the invention as described herein.

Operation 400 shows accessing a database, the database including a rule set formulated from at least one requirement, wherein the database includes a knowledge base. Operation 400 may include accessing a database, the database including a rule set formulated from at least one requirement, wherein the database includes a knowledge base, wherein, for instance, the rule set included in the knowledge base 106 may be compiled, for instance, by human experts, automated expert systems, or a combination of both, In this example, the rule set may be made available to parties including but not limited to the public, subscribers to a service providing for access to the rule set, or a single user or set of users with a proprietary interest in the rule set. The rule set may include logic business rules formulated from requirements such as the legal provisions of one or more jurisdictions or governing bodies (e.g., the EU and its member states) or from technical standard provisions governing, for example, product performance, taxation, social aspects, safety, environmental rules, and labeling, packing, and packaging issues. These exemplary concerns may relate to, for instance, textiles, electronics, chemical, medical diagnostic equipment, rubber and plastic products, construction, electrical and optical equipment, and financial services compliance, in, among many markets, Europe (within the context of the EU supranational level as well as the member states level), North America, and Asia. Such legal provisions may include but not be limited to, as a specific example, legal provisions governing textiles and textile products to be sold to establishments including hotels, clubs, conference halls, or restaurants, and interpretations, cases, and expert advice associated with those legal provisions.

The rules formulated from such requirements may include, for example, logic business rules in the form of IF-THEN statements. The rule set may be stored, for example, in the memory of a desktop or laptop computer, in memory resources accessible via a local network or a wide area network, in memory resources accessible via the Internet, or in some combination of such memory resources. In situations in which the memory resources are accessible via a local area network, a wide area network, or the Internet, the memory resources may include the memory of one or more servers. In this example, accessing the rule set may be accomplished using a desktop or laptop computer that includes the knowledge base processor 102 or the knowledge base memory 104 as shown in FIG. 1. Accessing the rule set may further be accomplished using a local network or the Internet, giving access to a server that includes the knowledge base processor 102, the knowledge base memory 104 or both.

Where the rule set is stored on an interface computer 110 as shown in FIG. 1, where the interface computer 110 is, for example, a desktop or laptop computer, the rule set may be accessed without need for a local network, a wide area network, or the Internet. Where the rule set is stored on computing resources such as a server accessible via a local network or a wide area network (represented by the network 101 in FIG. 1), access to the rule set may be given to computers allowed access to the local network. Where the rule set is stored on computing resources accessible via the Internet (represented by the network 101), access to the rule set may be given to computers configured to access, for instance, one or more Web sites or Web pages, such that access to the rule set is granted through such a Web site or Web page.

Operation 402 illustrates accepting input regarding circumstance data, the circumstance data regarding a subject of the at least one requirement. Operation 402 may include accepting input regarding circumstance data, the circumstance data regarding a subject of the at least one requirement, wherein, for example, the input regarding circumstance data may be accepted from an end-user (a human desiring a compliance audit), from an automated system, or from a combination of the two. To continue the example used to illustrate operation 400, the input regarding circumstance data may include but not be limited to the following: (1) an identification of items or manufacture of interest to an end-user (e.g., textiles and textile products), (2) an identification of the type of customer to which the textiles or textile products are to be sold (hotels, clubs, conference halls, restaurants, etc.), (3) an identification of any flame retardant chemicals used in the manufacture of the textiles or textile products (e.g., no use of PentaBDE, and no use of any of the flame retardant chemicals in a list presented to the end-user), (4) an identification of types of textile products to be sold (e.g. carpets and rugs), and (5) other data relevant to the legal provisions of the EU and its member states governing textiles treated with flame-retardant chemicals and their use in furnishing for hotels and similar pubic accommodations. The human end-user may use the interface 108 of the interface computer 110 as shown in FIG. 1 to enter the input regarding circumstance data.

Figure 5:
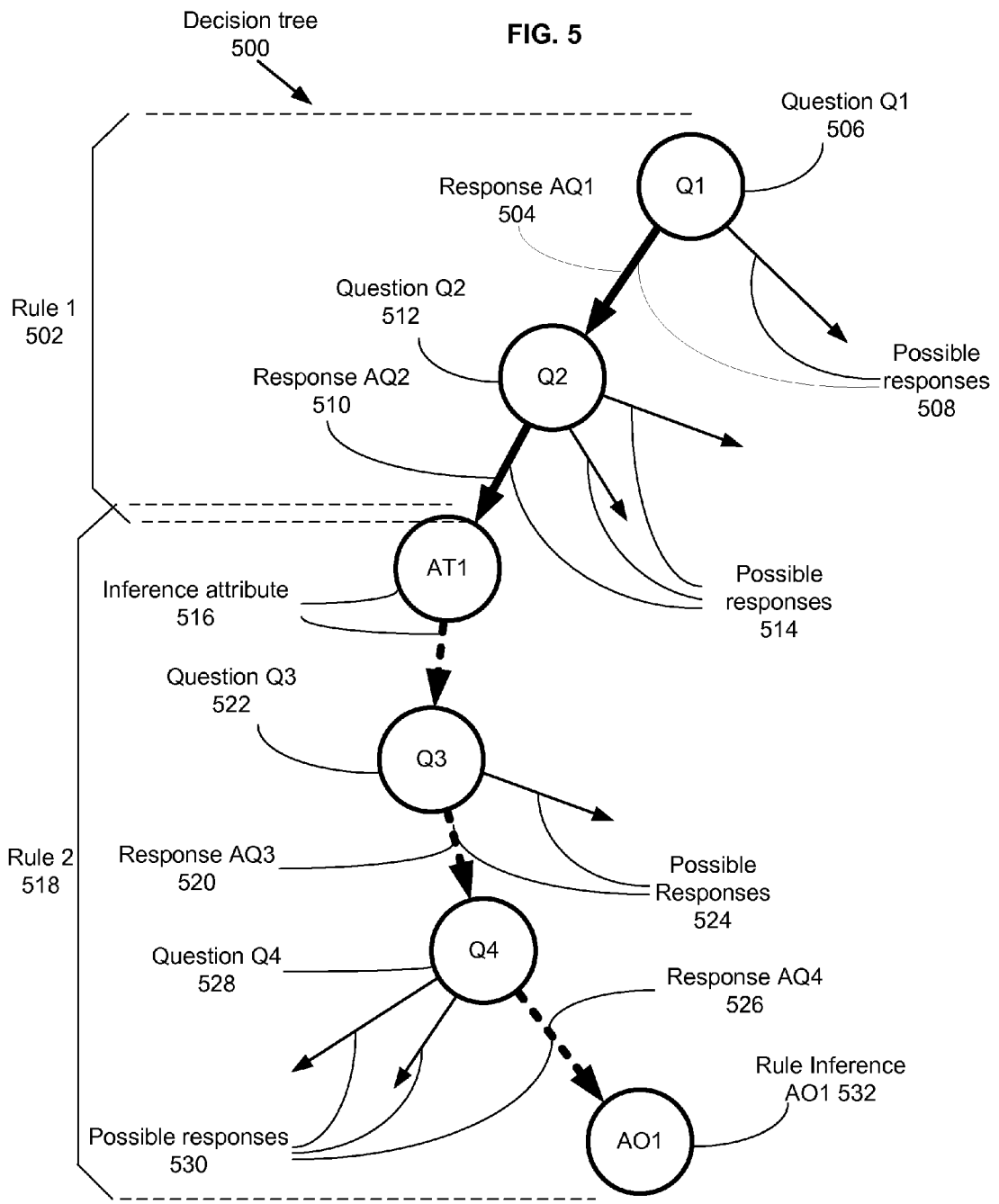
FIG. 5 shows a decision tree for accepting input regarding circumstance data or for applying a rule set to input regarding circumstance data in accordance with some embodiments of the invention.

Turning now to FIG. 5, an exemplary decision tree 500 that represents a data-driven approach is depicted in illustration of operation 402 as shown in FIG. 4. The exemplary decision tree 500 is based on two business rules and acceptance of input regarding circumstance data and application of the rule set to the input regarding circumstance data in conjunction with the decision tree 500. A system, such as an expert system, using data-driven reasoning (also known as forward chaining) keeps track of a current state of a problem solution and seeks rules that will move the state of the problem solution to an ultimate, conclusive solution. Put differently, forward chaining takes all data present and attempts to discover much as possible by applying as many rules as possible to them. Data-driven reasoning using uses IF-THEN rules to deduce a problem solution from initial data, such as data reflecting input regarding circumstance data. The IF-THEN rules may be presented in a decision-tree format that reflects a hierarchical, top-down set of decision criteria. Data-driven reasoning may be appropriate where the logic of business rules of interest may be expressed in decision tree format and a single correct solution, as opposed to, for example, an approximate solution, is expected.

Continuing with reference to FIG. 5, the exemplary decision tree 500 features a number of attribute types including but not limited to initial data (generically designated herein with the symbol "AI"; e.g., a specific item of initial data may be designated herein as "AI2"); questions (generically designated herein with the symbol "Q"; e.g., a specific question may be designated herein as "Q1"); responses to questions (generically designated herein with the symbol "AQ"; e.g., a specific response may be designated herein as "AQ1"); output of results of rule inference (generically designated herein with the symbol "AO"; e.g., a specific output of results may be designated herein as "AO1"); and internal temporary inference attributes (generically designated herein with the symbol "AT"; e.g., a specific temporary inference attribute may be designated herein as "AT1"). Typically, for a decision tree such as the decision tree 500, an input attribute is updated with an end-user's response to a question associate with the input attribute. Typically, at least one rule is needed for each node of a decision tree. Translation of business logic into a decision tree may be accomplished by a knowledge engineer or by use of hardware, software, firmware, or some combination of one or more of such hardware, software, and firmware to generate the decision tree automatically.

Attribute definitions, associations between attributes and questions texts, and rule definitions and other development tasks may be accomplished using, for example, the knowledge builder 316 as shown in FIG. 3. Further, the knowledge base 312 as shown in FIG. 3 may include a rule engine that evaluates a condition of a rule that uses an input attribute that is updated with a response to a question by causing the question to be presented, prompting a response from an end-user such as the end-user 302 of FIG. 3.

Continuing reference to FIG. 5, an exemplary decision tree 500 includes a first business rule 502 (herein "Rule 1" for purposes of this example) that includes the following logic:
  IF a first response 504 (herein "Response AQ1" 504) to a first question 506 (herein "Question Q1" 506) is a particular response (herein "value1," not shown in FIG. 5) selected from among two depicted possible responses 508 and
  a second response 510 (herein "Response AQ2" 510) to a second question 512 (herein "Question Q2" 512) that is invoked by the Response AQ1 504 is a particular response (herein "value2," not shown in FIG. 5) selected from among three depicted possible responses 514,
  THEN an internal temporary inference attribute 516 (herein "AT1") is assigned a value (herein "value3," not shown in FIG. 5) from among a number of possible of values (not shown in FIG. 5).

Where an end-user enters initial data that cues the Question Q1 506, and an end-users enters the response "value1" in response, the Response AQ1 504 is assigned the value "value1." Further, where the end-user enters the response "value2" to the Question Q2 invoked by Response AQ1 504, and the Response AQ2 is assigned the value "value2," Rule 1 502 is fired, that is, executed. As a result, "value3" is assigned to the internal temporary inference attribute AT1 516. The exemplary decision tree 500 also includes a second business rule 518 (herein "Rule 2") that includes the following logic:
  IF AT1 is value3 and
  a third response 520 (herein "Response AQ3" 520) to a third question 522 (herein "Question Q3" 522) is a particular response (herein "value4", not shown in FIG. 5) selected from among two depicted possible responses 524,
  a fourth response 526 (herein "Response AQ4" 526) to a fourth question 528 (herein "Question Q4" 528) invoked by Response AQ3 520 is a particular response (herein "value5", not shown in FIG. 5) selected from among three depicted possible responses 530,
  THEN an output of results of rule inference 532 (herein "Rule Inference AO1" 532) is assigned a value from among a number of possible values (herein "value6"; neither the other possible values nor "value6" are shown in FIG. 5).

Where an end-user enters Response AQ3 520 to the Question Q3 522, the Response AQ3 520 is assigned the value "value4." Further, where the end-user enters the response "value5" to the Question Q4 528 invoked by Response AQ3 520, and the Response AQ4 526 is assigned the value "value5," Rule 2 518 is fired, that is, executed. As a result, "value6" is assigned to the Rule Inference AO1 532, and the execution of the decision tree 500 ends. "Value6" may be, for example, an identifying number or name of an regulation provision requirement or the text of such a requirement.

Returning now to FIG. 4, operation 404 shows applying the rule set to the input regarding circumstance data. Operation 404 may include applying the rule set to the input regarding circumstance data, wherein, for example, the applying the rule set is performed either (1) interactively with the accepting input regarding circumstance data of operation 402, or (2) after the accepting input regarding circumstance data of operation 402, or some combination of both (1) and (2). Continuing the example used to illustrate operations 400 and 402, applying the rule set shown in operation 402 may include, for instance, applying the rule set to the already-inputted input regarding circumstance data (such as an identification of textiles and textile products) to identify a broad category of applicable requirements and to determine what other input regarding circumstance data may be required to further apply the rule set, e.g., to reduce the broad category of applicable requirements to a narrower set of applicable requirements. This determination determines the next prompt or prompts for input regarding circumstance data to the end-user, for instance, prompts for input regarding circumstance data including an indication that the textiles or textile products are to be sold to establishments including hotels, clubs, conference halls, or restaurants. The prompt or prompts being presented to the end-user, the end-user provides the input regarding circumstance data, which is accepted under operation 402, applied under operation 404, and so on until the rule set has been fully applied to all input regarding circumstance data. The rule set may be applied using, for example, the application processor 112, the application memory 114, and the network 101 as shown in FIG. 1.

Referring again to FIG. 5, the exemplary decision tree 500 shown in and described in connection with operation 402, shown in FIG. 4, and based on two business rules and acceptance of input regarding circumstance data and application of the rule set to the input regarding circumstance data in conjunction with the decision tree 500, is also exemplary of operation 404. That is, the exemplary decision tree 500 also illustrates applying the rule set to the input regarding circumstance data as shown in operation 404.

Figure 6:
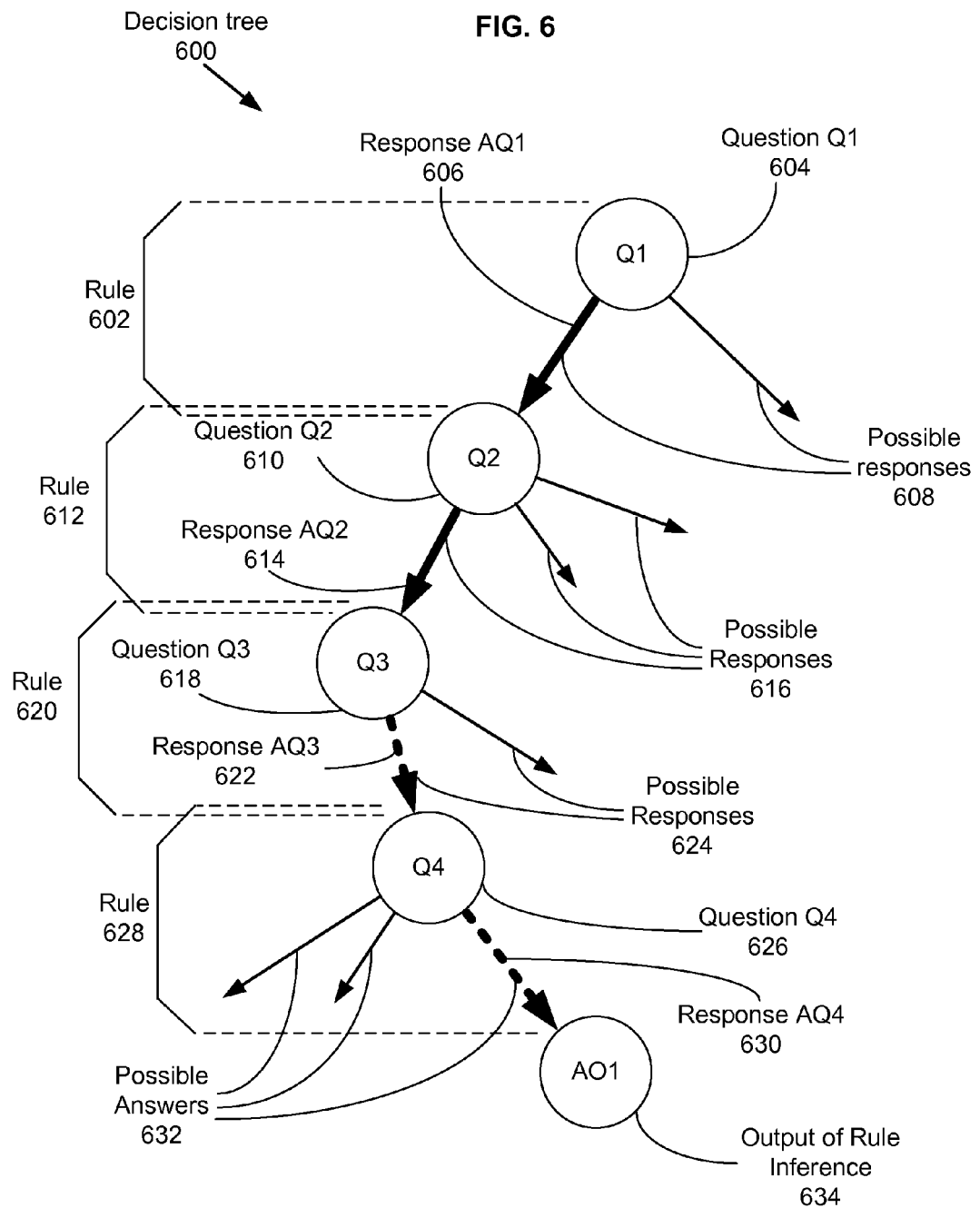
FIG. 6 shows a decision tree for accepting input regarding circumstance data or for applying a rule set to input regarding circumstance data in accordance with some embodiments of the invention.

Turning now to FIG. 6, an additional exemplary decision tree 600 based on four business rules, and acceptance of input regarding circumstance data and application of the rule set to the input regarding circumstance data in conjunction with the exemplary decision tree 600, are shown in illustration of operation 404 (shown in FIG. 4). The exemplary decision tree 600 of FIG. 6 is provided to illustrate a data-driven decision tree with a different specific structure than the data-driven decision tree shown in FIG. 5. The exemplary decision tree 600 includes a first business rule 602, which includes the following logic:

IF a first response 604 (herein "Response AQ1" 604) to a first question 606 (herein "Question Q1" 606) is a particular response (herein "value1," not shown in FIG. 6) selected from among two depicted possible responses 608

THEN go to a second question 610 (herein "Question Q2" 610).

Where an end-user enters initial data that cues the first Question Q1 606, and an end-user enters the response "value1" in response, the Response AQ1 604 is assigned the value "value1" and the first business rule 602 is fired, that is, the first business rule 602 is executed. The decision tree 600 further includes a second business rule 612 which includes the following logic:

IF at question Q2 610 and
a second response 614 (herein "AQ2") to a second question Q2 610 is a particular response (herein "value2," not shown in FIG. 6) selected from among three depicted possible responses 616

THEN go to a third question 618 (herein "Question Q3" 618).

Where the Question Q2 610 is presented in response to the logic of the first business rule 602 and the end-user enters the response "value2" in response, the Response AQ2 614 is assigned the value "value2" and the second business rule 612 is fired, that is, executed. The decision tree 600 further includes a third business rule 620 which includes the following logic:

IF at Question Q3 618 and
a third response 622 (herein "AQ3" 622) to a third question 618 (herein "Q3") is a particular response (herein "value3," not shown in FIG. 6) selected from among two depicted possible responses 624

THEN go to a fourth question 626 (herein "Question Q4" 626).

Where the Question Q3 618 is presented in response to the logic of the second business rule 618 and the end-user enters the response "value3" in response, the Response AQ3 622 is assigned the value "value3" and the third business rule 620 is fired, that is executed. The decision tree 600 includes a fourth business rule 628 which includes the following logic:

IF at Question Q4 626 and
a fourth response 630 (herein "Response AQ4" 630) to a fourth question 626 (herein "Question Q4" 626) is a particular response (herein "value4" not shown in FIG. 6) selected from among three depicted possible responses 632, THEN an output of results of rule inference 634 (herein "Inference AO1" 634) is assigned a value (herein "value5," not shown in FIG. 6) from a number of possible values (not shown in FIG. 6).

Where the Question Q4 626 is presented in response to the logic of the third business rule 620 and the end-user enters the response "value4" in response, the fourth business rule 628 is fired, that is, executed. An output of Inference AO1 634, a value of "value5" (e.g., the identifying number or title of a statutory requirement, or the test of such a requirement) is the result of execution of the decision tree 600, and the execution of the decision tree 600 ends.

The exemplary decision tree 600, the acceptance of input regarding circumstance data, and the application of the rule set to the input regarding circumstance data in conjunction with the exemplary decision tree 600 that are shown in illustration of operation 404 (shown in FIG. 4), is also exemplary of operation 402 (also shown in FIG. 4). That is, the exemplary decision tree 500 also illustrates accepting input regarding circumstance data, the circumstance data regarding a subject of the at least one requirement as shown in operation 402.

Returning now to FIG. 4, operation 406 depicts generating a compliance audit report based on applying the rule set to the input regarding circumstance data. Operation 406 may include generating a compliance audit report based on applying the rule set to the input regarding circumstance data, wherein the compliance audit report may include but not be limited to, for example, a report including relevant legal provisions, interpretations of those provisions, and cases applying those provisions or relevant expert advice. Continuing the examples used to illustrate operations 400, 402, and 404, the compliance audit report may include but not be limited to a report including relevant EU directives and regulations and EU member state statutes and regulations, along with interpretations of those provisions, cases applying those provisions, and expert advice concerning those legal provisions and the associated interpretations and cases to the product of interest to the end-user. The compliance audit report may further include, for instance, an evaluation of whether a particular textile treated with a particular chemical fire-retardant may be used in a particular furnishing, such as a rug, to be sold for use in a hotel, in compliance with the legal provisions of the EU. For instance, operation 406 may include generating a compliance audit report including a report that the provision, "EN 9239 Part 1, Reaction to fire tests for floorings—Part 1: Determination of the burning behaviour using a radiant heat source," is among the requirements that a carpet or rug to be sold to establishments including hotels, clubs, conference halls, or restaurants must meet.

Figure 7:
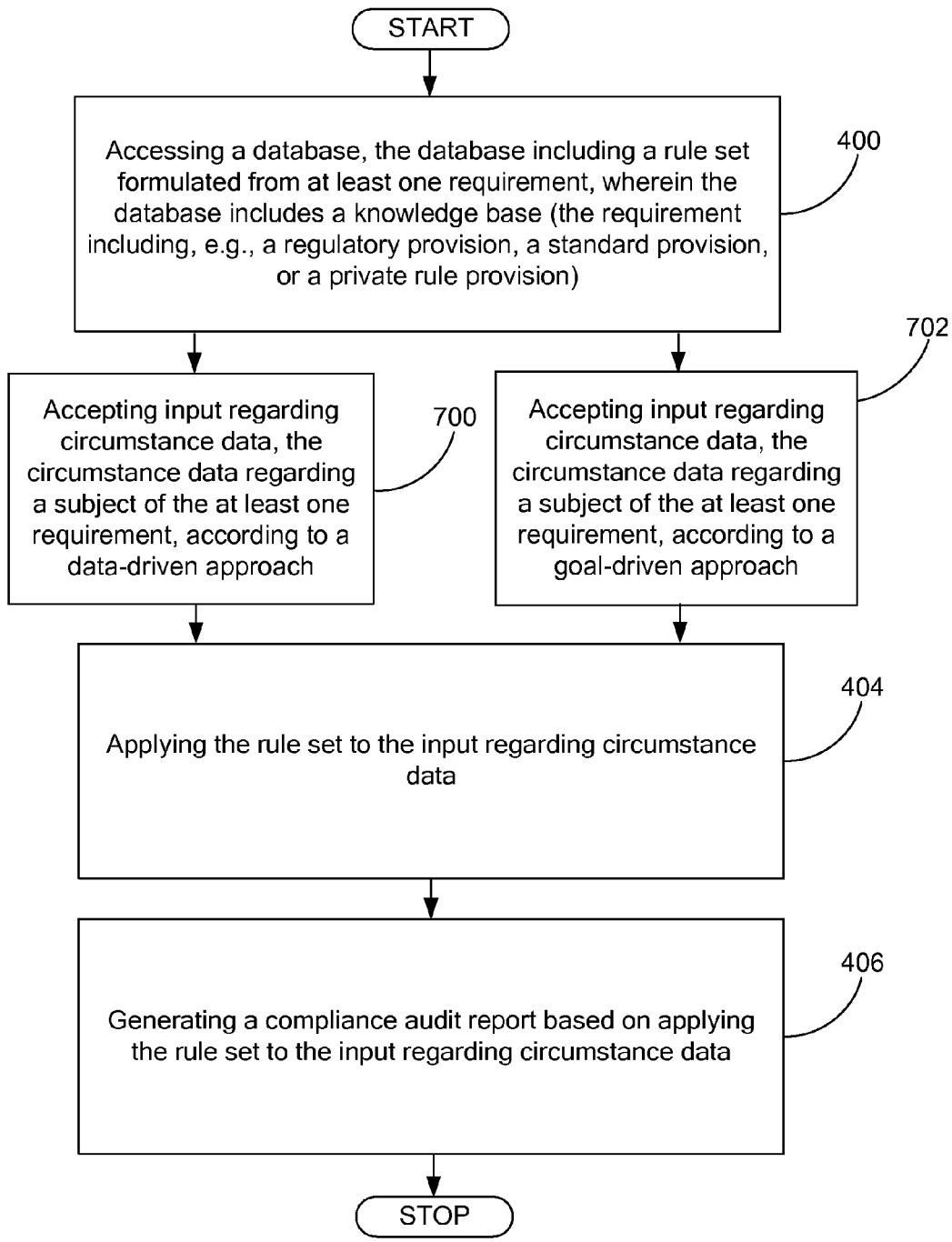
FIG. 7 shows a high-level logic flowchart of an operational process for conducting a compliance audit in accordance with some embodiments of the invention.

Referring to FIG. 7, a method for conducting a compliance audit is shown. The method includes one or more of the following operations: 400, 402, 404, and 406, which are described above in connection with FIG. 4. In addition, operation 402 may include one or more of the following operations: 700 and 702.

Operation 700 depicts accepting the input regarding circumstance data according to a data-driven approach. Operation 700 may include accepting the input regarding circumstance data according to a data-driven approach, wherein, for example, the interface 108 is used to accept input regarding circumstance data by an end-user in response to one or more questions formed by hardware, software, firmware (or some combination of one or more of such hardware, software, and firmware) incorporated in whole or in part in the application processor 112, the application memory 114 depicted in FIG. 1, or both the application processor 112 and the application memory 114. In this example, an input regarding circumstance data in the form of an answer to a question results in the use of the application processor 112, the application memory 114, the knowledge base processor 102, and the knowledge base memory 104 depicted in FIG. 1 to retrieve one or more logic business rules from the rule set. The answer to the question is used to select a further question or questions through the use of a decision tree as described above, of which the one or more logic business rules form one or more nodes, to solicit further input regarding circumstance data from the end-user. An off-the-shelf forward-chaining rule-based expert system shell with a pseudo-natural language database, such as ESI's Logist rule engine or the Blaze Advisor® business rules management system from FairIsaac®, may be used in an embodiment including operation 700.

Continuing to refer to FIG. 7, in illustration of operation 700 and continuing the textile-based example used to illustrate operations 400 and 402, accepting the input regarding circumstance data according to a data-driven approach may begin with an end-user beginning with accessing a rule set included in the knowledge base 106 using the knowledge base processor 102 and the knowledge base memory 104. In this example, a first rule of four rules is invoked, requiring input regarding circumstance data. These four rules are not shown in FIG. 7, but they are analogous to the rules 602, 612, 620, and 628 of the decision tree 600 as shown in FIG. 6 in terms of the rules' relationship to one another in a decision tree. The first rule (analogous to the rule 602 of FIG. 6) has this structure:

IF response to prompt, "manufacturer's type?" is "textile and textile products,"
    THEN ask question, "Are you selling to hotels, clubs, conference halls, restaurants, etc.?"

This first rule requires input regarding circumstance data that indicates the "manufacturer's type," i.e., the type of product of interest to the end-user. A prompt for the "manufacturer's type" (analogous to the Question Q1 606 of FIG. 6) is presented using the interface 108 of the interface computer 110 as shown in FIG. 1, and the end-user enters an answer, "textile and textile products" (analogous to the Response AQ1 604 of FIG. 6) with the interface 108 of the interface computer 110 being used to accept the input.

Continuing reference to FIG. 7, according to the first rule, if the "manufacturer's type" is "textiles and textile products," then the first rule is fired. As a result, a second rule (not shown in FIG. 7; analogous to the rule 612 shown in FIG. 6) requiring an answer to the question, "Are you selling to hotels, clubs, conference halls, restaurants, etc.?" (not shown in FIG. 7; analogous to the Question Q2 610 of FIG. 6), may be invoked. The second rule may be invoked using the application processor 112 executing instructions, the application memory 114, the knowledge base processor 102 executing instructions, and the knowledge base memory 104 as shown in FIG. 1. The prompt may be presented using the interface 108 of the interface computer 110 shown in FIG. 1. The second rule has this structure:

IF the answer to the question, "Are you selling to hotels, clubs, conference halls, restaurants, etc.?" is "yes,"
    THEN ask questions,
    (1) "Did you use the flame retardant chemical PentaBDE?"; and
    (2) "Did you use any flame retardant chemical of the following kinds? [presented with a list of flame retardant chemicals]."

This second rule requires input regarding circumstance data answering the question "Are you selling to hotels, clubs, conference halls, restaurants, etc.?" where the question is presented using the interface 108 of the interface computer 110 shown in FIG. 1. The end-user enters the answer "yes" (not shown in FIG. 7; analogous to the Response AQ2 614 shown in FIG. 6), and again the input is accepted using the interface 108 of the interface computer 110.

Continuing reference to FIG. 7, according to the second rule, if the question "Are you selling to hotels, clubs, conference halls, restaurants, etc.?" has been asked and the answer is "yes," then the second rule is fired. As a result, a third rule (not shown in FIG. 7; analogous to the Rule 620 shown in FIG. 6) requiring answers to two further questions, "Did you use the flame retardant chemical PentaBDE?" and "Did you use any flame retardant chemical of the following kinds? [presented with a list of flame retardant chemicals]," may be invoked. The third rule may be invoked using the application processor 112 executing instructions, the application memory 114 executing instructions, the knowledge base processor 102 and the knowledge base memory 104 illustrated in FIG. 1. The questions may be presented using the interface 108 of the interface computer 110 shown in FIG. 1. The third rule has this structure:

IF the answer to the questions
    (1) "Did you use the flame retardant chemical PentaBDE?"; and
    (2) "Did you use any flame retardant chemical of the following kinds? [presented with a list of flame retardant chemicals]," are
    "no" and "no use of any of the chemicals listed below," respectively,
    THEN ask question, "[What is the] product sub-specification? [with a presentation of a list of textile products and uses of textiles]."

Continuing to refer to FIG. 7, the end-user enters the respective answers "no" and "no use of any of the chemicals listed below," as input regarding circumstance data, and the interface 108 of the interface computer 110 may be used to accept the input. According to the third rule, if the questions "Did you use the flame retardant chemical PentaBDE?" and "Did you use any flame retardant chemical of the following kinds? [presented with a list of flame retardant chemicals]" have been asked and the respective answers are "no" and "no use of any of the chemicals listed below" (not shown in FIG. 7; taken together, the answers are analogous to the Response AQ3 622 shown in FIG. 6) then the third rule is fired. As a result, a fourth rule (not shown in FIG. 7; analogous to the rule 628 shown in FIG. 6) requiring an answer to the question, "[What is the] product sub-specification? [with a presentation of a list of textile products and uses of textiles]" (not shown in FIG. 7; analogous to the Question Q4 626 shown in FIG. 6), is invoked. This question may be invoked using the application processor 112 executing instructions, the application memory 114, the knowledge base processor 102 executing instructions, and the knowledge base memory 104 shown in FIG. 1. The question may be presented using the interface 108 of the interface computer 110 shown in FIG. 1. The fourth rule has this structure:

IF the answer to the question, "[What is the] product sub-specification? [with a presentation of a list of textile products and uses of textiles]," is "carpets and rugs,"
    THEN the law "EN 9239," is relevant.

This fourth rule may require input regarding circumstance data answering the further question, "[What is the] product sub-specification? [with a presentation of a list of textile products and uses of textiles]." The interface 108 and the interface computer 110 may be used to accept the end-user's answer, "carpets and rugs."

Continuing with reference to FIG. 7, according to the fourth rule, if the question "[What is the] product sub-specification? [with a presentation of a list of textile products and uses of textiles]," has been asked and the answer "carpets and rugs" accepted, then the fourth rule is fired. As a result, the law "EN9239" (not shown in FIG. 7; analogous to the Output of Rule Inference 634 shown in FIG. 6) is inferred to be relevant using the application processor 112 executing instructions, the application memory 114, the knowledge base processor 102 executing instructions, and the knowledge base memory 104 depicted in FIG. 1. The law "EN9239" is inferred to be relevant by execution of the decision tree of which the four rules of this example illustrating operation 700 are a part.

FIGS. 8, 9, 10, 11, 12, 13, 14, 15, and 16 depict screenshots of a Web browser (in this case, Microsoft Internet Explorer®) directed to a Web site of a compliance audit service vendor. This series of figures depicts successive stages of accepting input regarding circumstance data, the circumstance data regarding a subject of the at least one requirement. The descriptions of these screenshot figures are used herein to elaborate in detail the preceding example used to illustrate operation 700 of FIG. 7.

Figure 8:
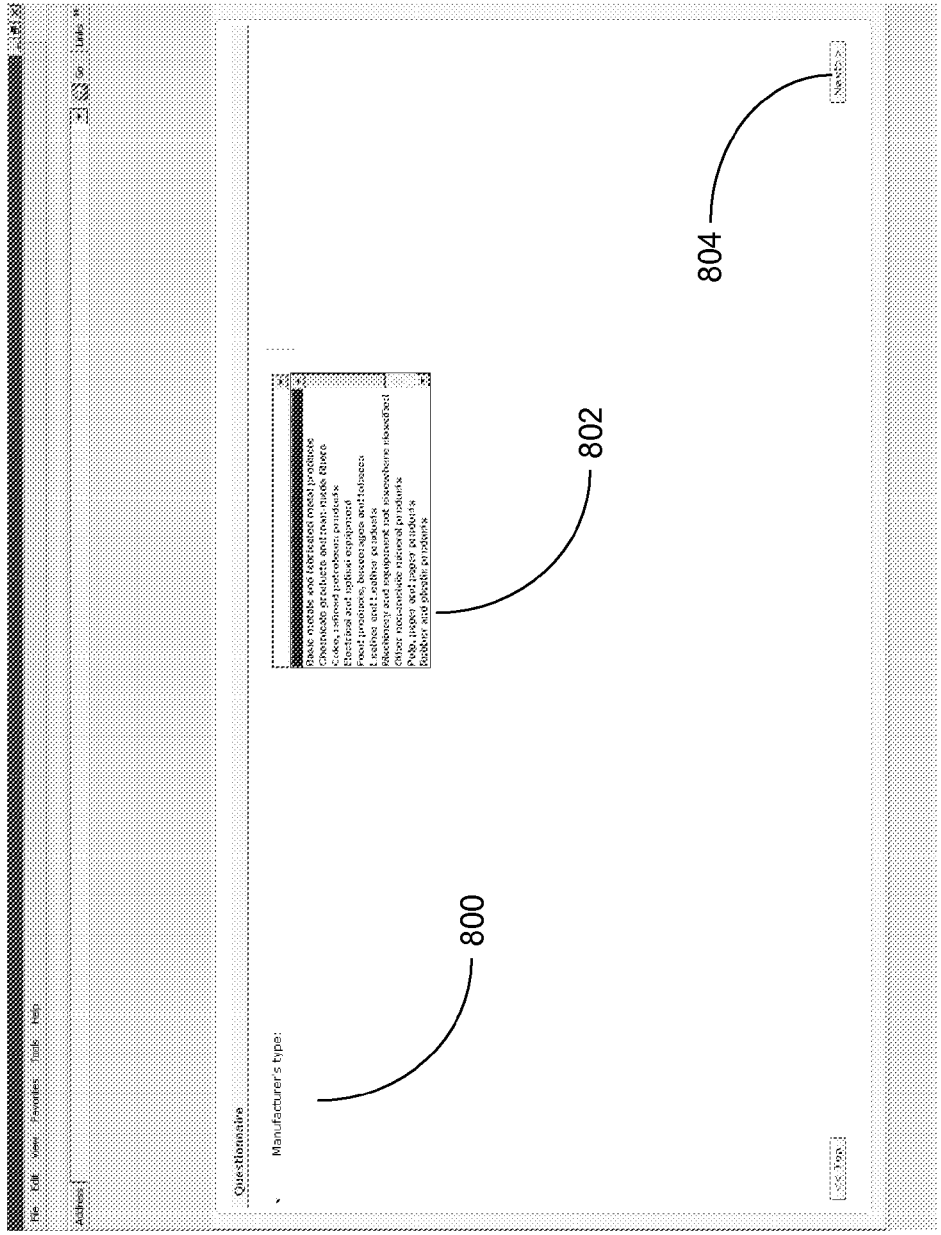
FIG. 8 shows an exemplary screenshot of a Web browser interface for accepting input regarding circumstance data, specifically a prompt for the type of manufacturer for which a compliance audit is sought, in accordance with some embodiments of the invention.
Figure 9:
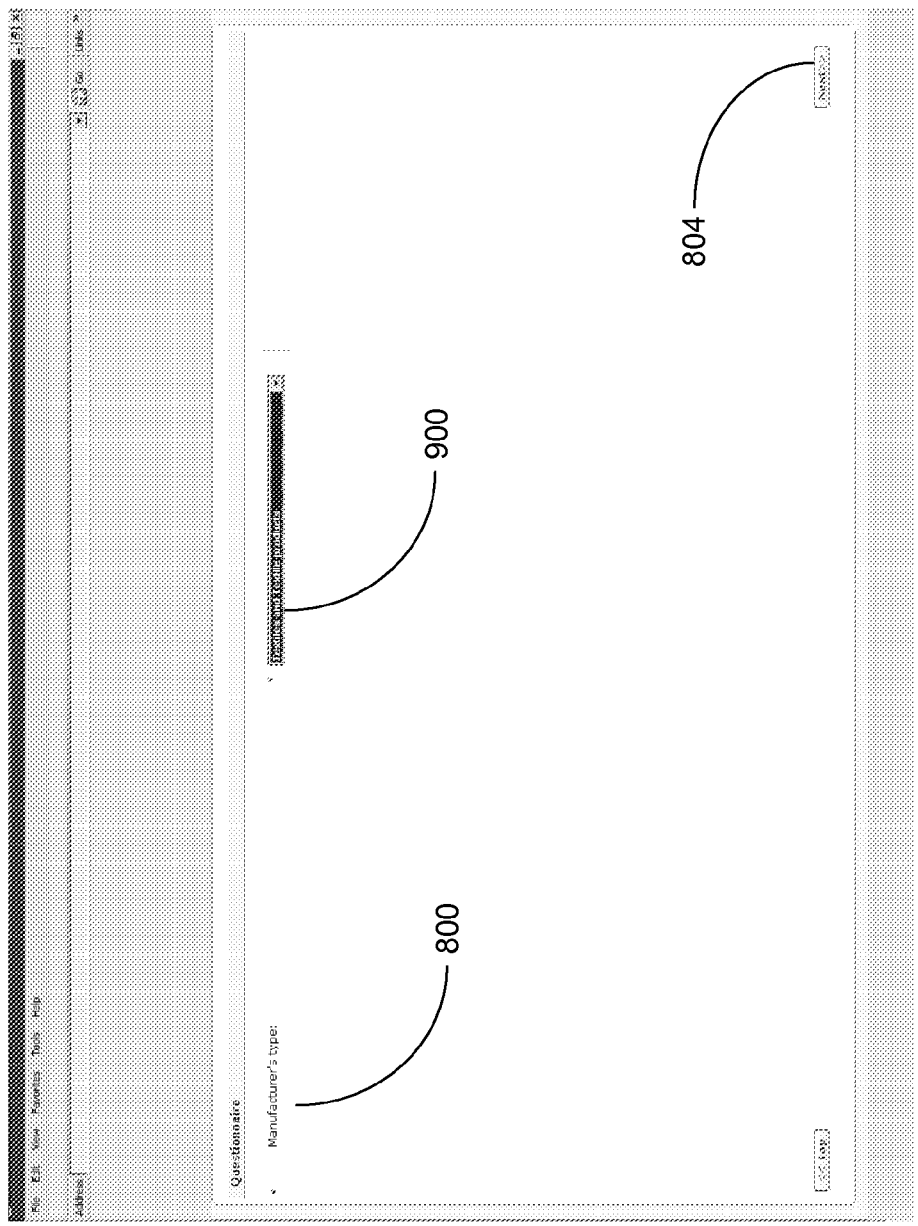
FIG. 9 shows an exemplary screenshot of a Web browser interface for accepting input regarding circumstance data, specifically showing designation of a specific choice of a type of manufacturer, in accordance with some embodiments of the invention.

Turning now to FIG. 8, an exemplary screenshot of a Web browser directed to a Web site of a compliance audit service vendor is shown. Generally, a graphical user interface, of which the screenshot depicted in FIG. 8 is an example, may present one or more prompts for an end-user to enter an answer to a question or other request for input, where the prompts may be mandatory or optional. The end-user may select a response from, for instance, a dropdown menu and input the selected information by, for instance, engaging an onscreen "next" button. Successive presentations, such as a series of Web browser screens, may be made until a result of an audit, such as a reference to or a text of a relevant regulation is presented to an end-user. In addition, an option for the end-user to navigate through the business rules activated by the compliance audit may be presented upon, for example, engagement of a "how" button of the presented Web page. In the specific screenshot illustrated in FIG. 8, a prompt 800 for a user to enter the "manufacturer's type" is presented with a dropdown menu 802 via the Web browser using the interface 108 of the interface computer 110 shown in FIG. 1, in accordance with the first of four rules of the example used herein to illustrate operation 700. The prompt presents possible manufacturer's types, e.g., "basic metals and fabricated metal products," "leather and leather products," "textiles and textile products" (an option not shown in FIG. 8), and so forth. The exemplary screenshot of FIG. 8 also includes a "next" button 804. Turning now to FIG. 9, an exemplary screenshot is depicted in which the "manufacture's type" "textiles and textile products" is the selection 900. Once a selection is made, an end-user may proceed to the next screen by clicking the "next" button 804.

Figure 10:
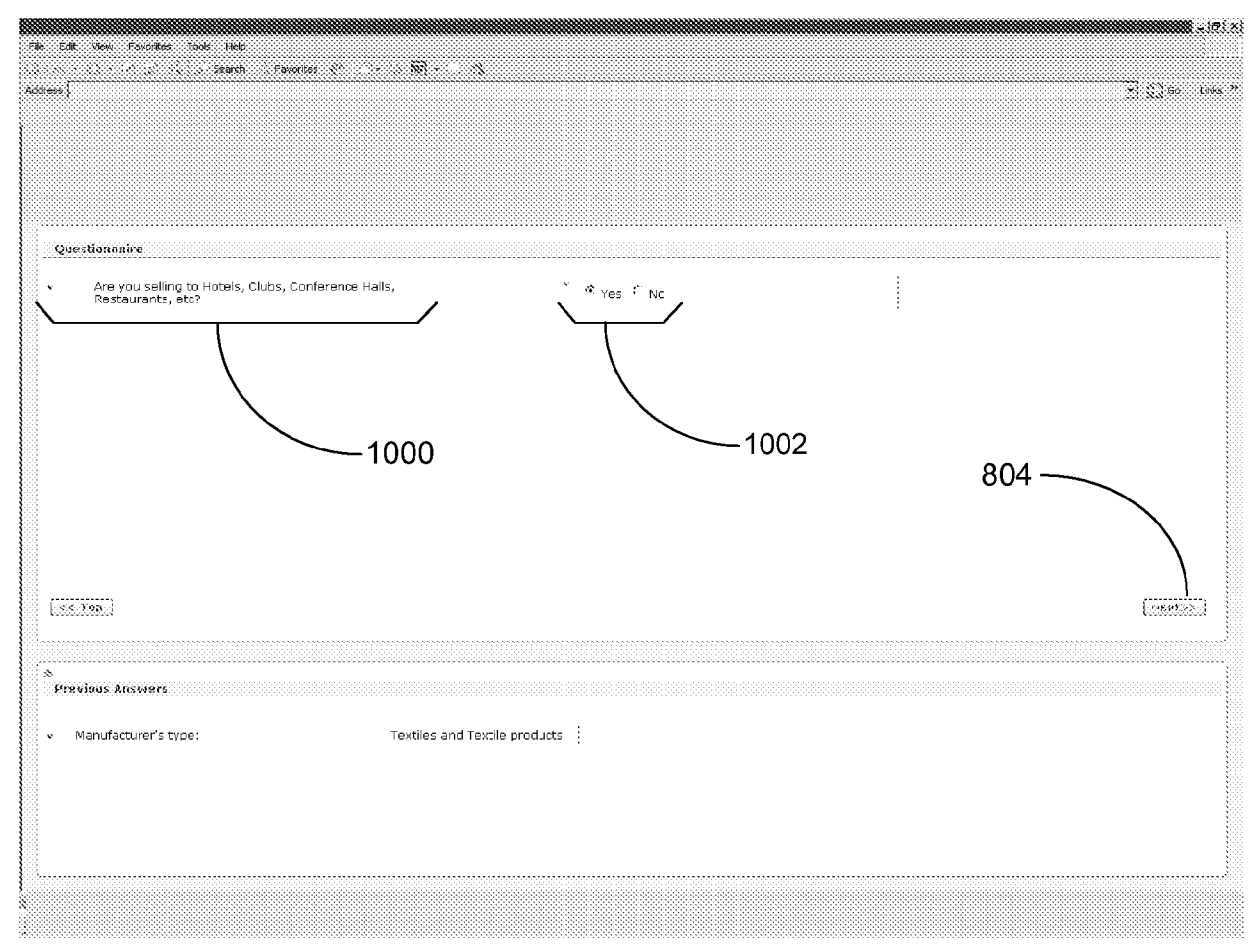

Turning now to FIG. 10, an exemplary screenshot is shown presenting a prompt 1000 for a user to enter a response to the question, "Are you selling to hotel, clubs, conference halls, restaurants, etc.?" in accordance with the second of four rules of the example used herein to illustrate operation 700 The available choices 1002 are "yes" and "no." In the exemplary screenshot of FIG. 10, the answer "yes" has been selected.

Figure 11:
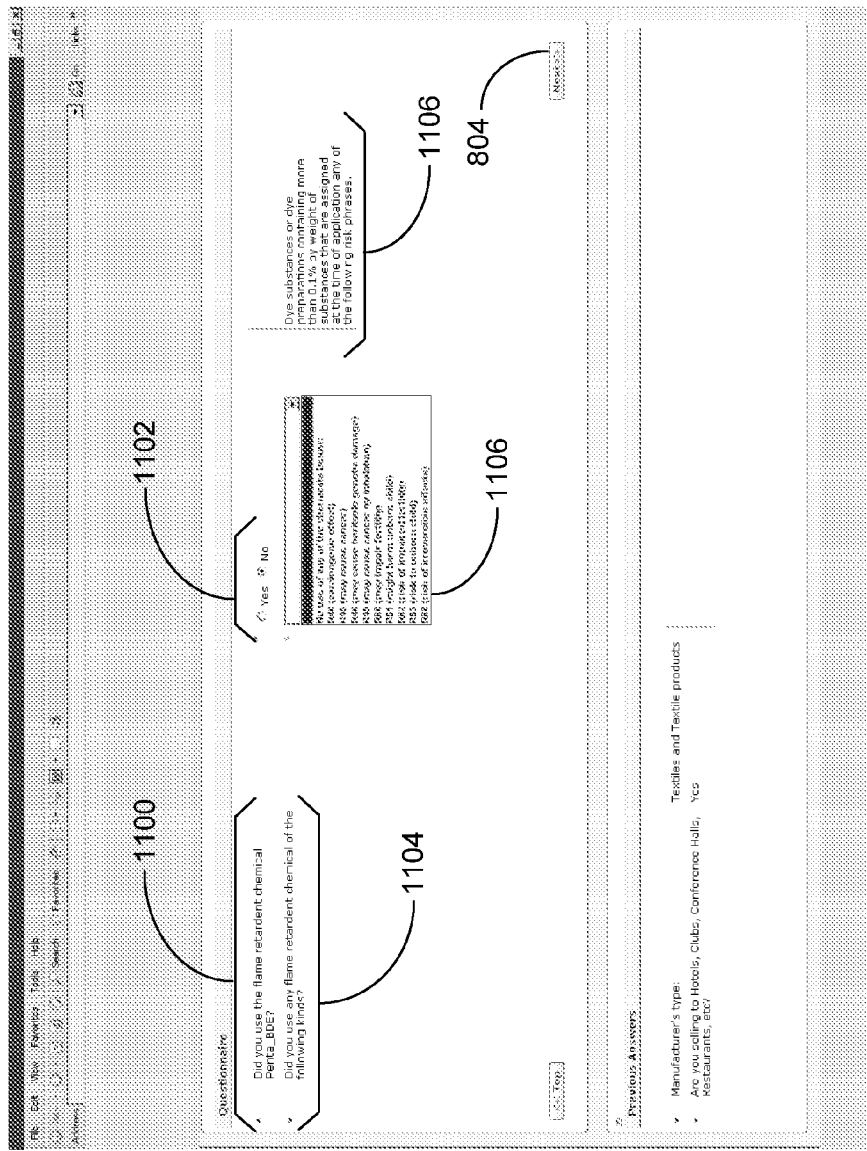
FIG. 11 shows an exemplary screenshot of a Web browser interface for accepting input regarding circumstance data, specifically a response to a question, in accordance with some embodiments of the invention.
Figure 12:
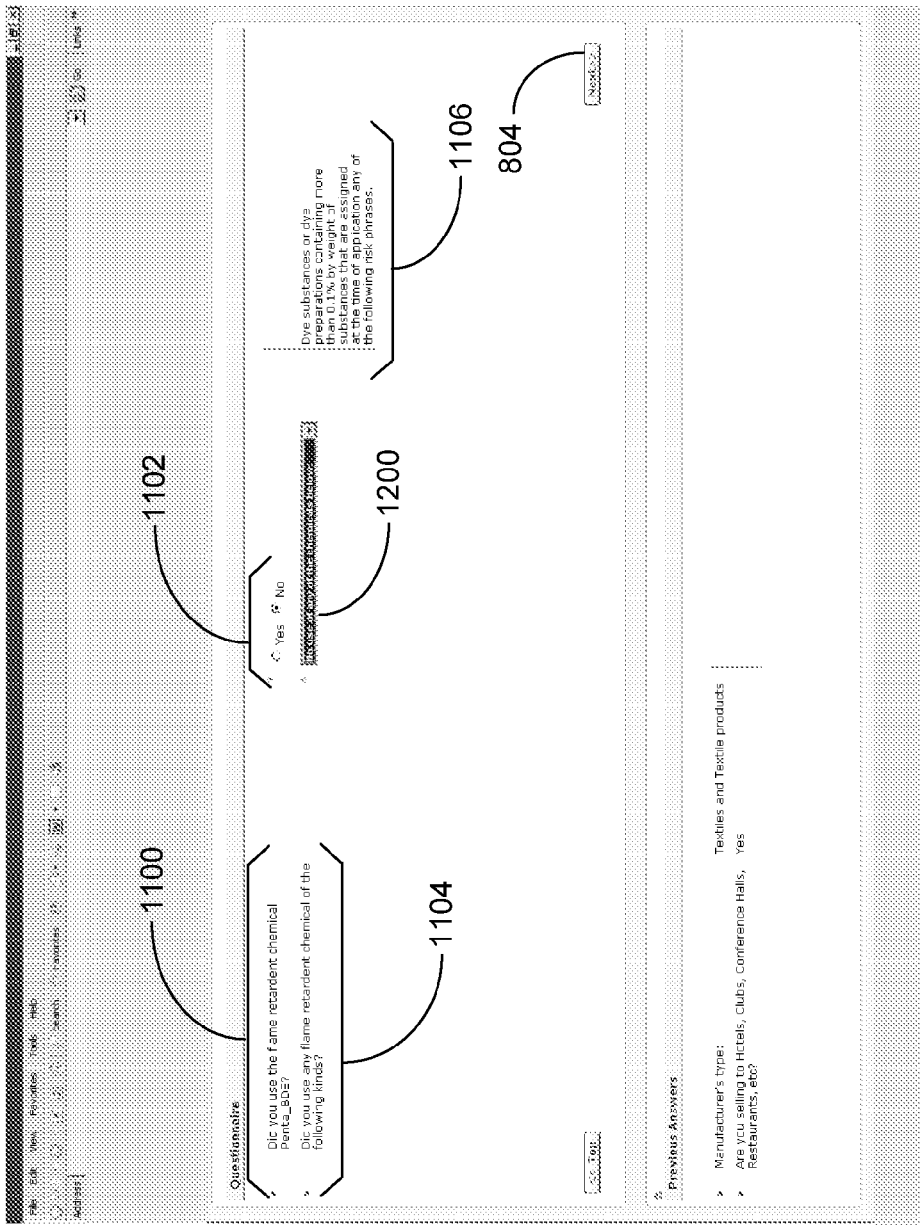
FIG. 12 shows an exemplary screenshot of a Web browser interface for accepting input regarding circumstance data, specifically a response to a question, in accordance with some embodiments of the invention.

Referring to FIG. 11, an exemplary screenshot is shown presenting, in accordance with the third of four rules of the example used herein to illustrate operation 700, a prompt 1100 for a user to enter a response to the question, "Did you use the flame retardant chemical PentaBDE?" The available responses 1102 are "yes" and "no." Further, in accordance with the third rule, the exemplary screenshot presents a prompt 1104 for a user to enter a response to the question "Did you use any flame retardant chemical of the following kinds?" along with a dropdown menu 1106 including list of possible answers such as "R40 (carcinogenic effect)," "R60 (may impair fertility)," "no use of any of the chemicals below," and so forth. In connection with the question, "Did you use any flame retardant chemical of the following kinds?" and its possible responses, the exemplary screenshot features an explanatory note 1108, "Dye substances or dye preparations containing more than 0.1% by weight of substances that are assigned at the time of application any of the following risk phrases." The exemplary screenshot of FIG. 11 shows that the response "no" has been selected for the question, "Did you use the flame retardant chemical PentaBDE?" while no response has been selected for the question, "Did you use any flame retardant chemical of the following kinds?" Turning now to FIG. 12, FIG. 12 shows an exemplary screenshot showing that the response 1102 "no" has been selected for the question of prompt 1100, "Did you use the flame retardant chemical PentaBDE?" and the response 1200 "no use of any of the chemicals below" has been selected from the dropdown menu 1106 for the question of prompt 1104, "Did you use any flame retardant chemical of the following kinds?"

Figure 13:
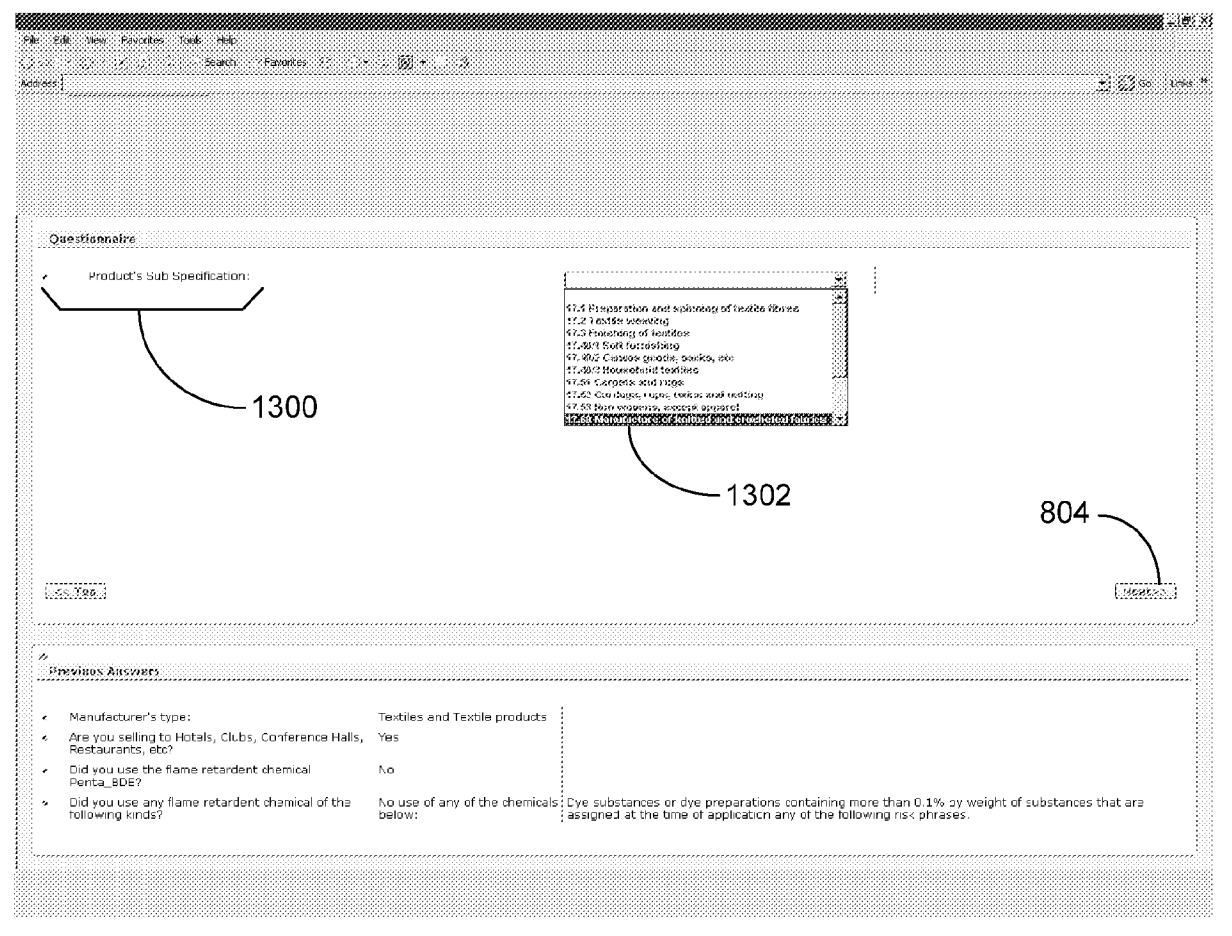
Figure 14:
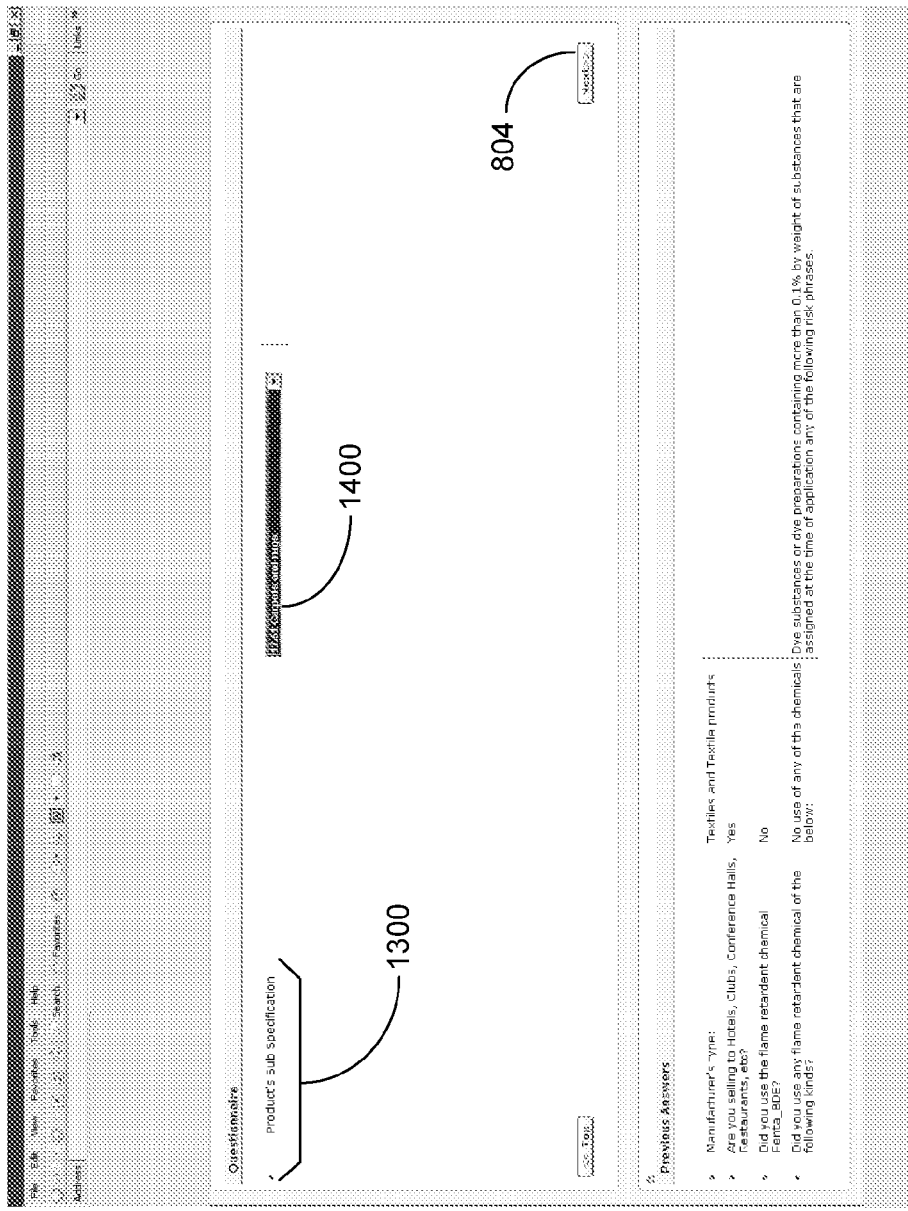
FIG. 14 shows an exemplary screenshot of a Web browser interface for acceptance of input regarding circumstance data, specifically selection of a specific option, in accordance with some embodiments of the invention.

Turning now to FIG. 13, an exemplary screenshot is shown presenting a prompt 1300 for a user to enter a response to specify a "product's sub-specification" to answer the question "[What is the] product sub-specification? [with a presentation of a list of textile produces and uses of textiles]" in accordance with the fourth of four rules of the example used herein to illustrate operation 700. The exemplary screenshot also presents a dropdown menu 1302 with a list of possible responses such as "17.1 Preparation and spinning of textile fibres," "17.51 Carpets and rugs," and so forth. Turning now to FIG. 14, an exemplary screenshot is illustrated showing that the response 1400 "17.51 Carpets and rugs" has been selected as the response to the question of prompt 1300, "[What is the] product sub-specification?"

Figure 15:
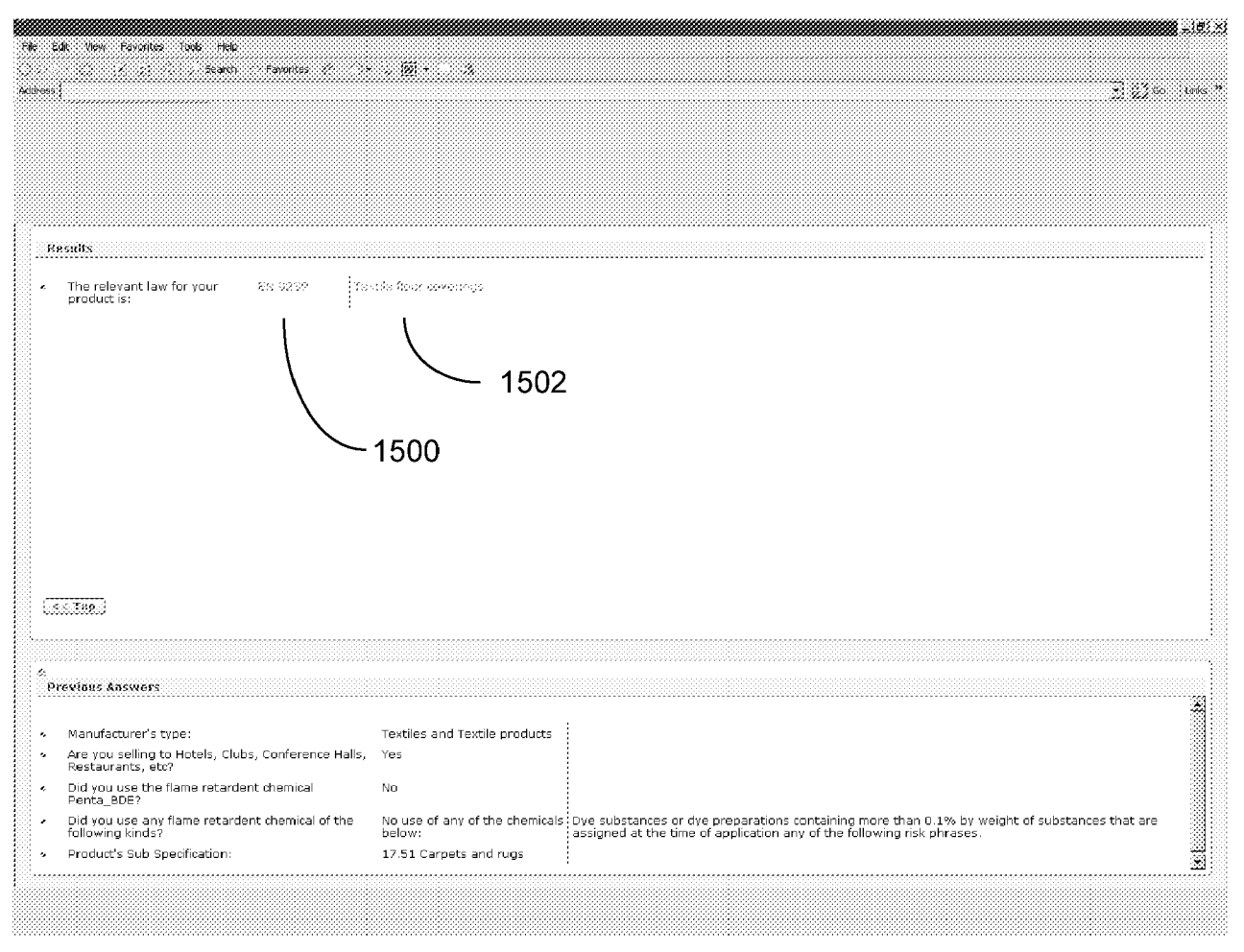
Figure 16:
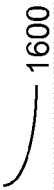
FIG. 16 shows an exemplary screenshot of a Web browser interface for presentation of compliance audit information, specifically text of a particular law that is relevant to the party seeking a compliance audit, in accordance with some embodiments of the invention.

Referring to FIG. 15, an exemplary screenshot is shown in which a reference 1500 to the law "EN9239" is presented along with a caption 1502 associated with the law "EN9239," "textile floor coverings," in accordance with the determination of the relevance of the law "EN9239" by the execution of the four-rule decision tree used herein to illustrate operation 700. Turning now to FIG. 16, an exemplary screenshot is shown, in which a text 1600 associated with the law "EN9239" is presented, e.g., the text of the law or a commentary on the law.

The preceding exemplary four-rule decision tree execution and screenshots illustrate operation 700 of FIG. 7, accepting the input regarding circumstance data according to a data-driven approach. Returning now to FIG. 7, operation 702 shows accepting the input regarding circumstance data according to a goal-driven approach. Operation 702 may include accepting the input regarding circumstance data according to a goal-driven approach wherein, for example, the interface 108 is used to accept input regarding circumstance data by an end-user in response to one or more questions formed by hardware, software, firmware (or some combination of one or more of such hardware, software, and firmware) incorporated in whole or in part in the application processor 112 or the application memory 114 depicted in FIG. 1, or both the application processor 112 and the application processor 114. In this example, the goal is to determine whether a particular regulatory or technical standard provision is applicable to the input regarding circumstance data. Hardware, software, or firmware associated with or operably coupleable to the application processor 112, the application memory 114, or both the application processor 112 and the application processor 114 check attributes of the particular regulatory or technical conformity provision one by one. This checking may be performed according to a priority mechanism, and attempts to assign values to those attributes may be performed, by checking the logic business rules in the rule set that provide values for the attributes. The priority mechanism may include a priority scheme developed by one or more human actors such as a rule expert or an end-user, or a priority scheme based on statistics reflecting past occurrences of attributes, or a priority scheme designed to minimize the number or questions required to reach the desired result. For each logic business rule, all of the rule conditions are checked in the order the conditions occur in the syntax of the rule. If a given logic business rule requires that an additional rule provide an attribute, the additional rule is checked in a similar manner. If an attribute requires input regarding circumstance data, one or more questions are presented to prompt input regarding circumstance data for an end-user. The required input regarding circumstance data is prompted for and accepted until all relevant logic business rules from the rule set may be checked.

As an alternative to data-driven reasoning, goal-driven reasoning, also known as backward chaining, is a way to solve problems that can be modeled as "structured selection" problems. In goal-driven reasoning, the aim is to choose the best choice, not necessarily the correct choice, from many enumerated possibilities. Goal-driven reasoning uses an inference technique that uses IF-THEN rules to break a goal into smaller sub-goals repetitively, where the sub-goals are easier to prove. Goal-driven reasoning has no data-store to draw upon and endeavors to determine a "best-fit" resolution through logic and prediction.

The use of goal-driven reasoning is an alternative approach to data-driven reasoning. Thus, for instance, in goal-driven reasoning, the source materials for rules are in the form of legislative text and writing business rules out of the legislative text may be simpler than translating the legislative text into a decision tree.

The main characteristics of goal-driven inference are (1) using simple rules written to express business logic, thus there is no need for decision tree representation (although it is possible to generate a decision tree illustration from the rules); (2) no requirement to define an entry point, that is, a first question; (3) using bottom-up inference; (4) scanning of output attributes until at least one output attribute gets a value; (5) presenting of the required questions based on the rule syntax order; and, (6) if one condition of an rule is false, stopping of checking of that rule and continuing to the next rule and output attribute to be checked. A rule may update more than one output attribute; in this case, the output attributes updated by the rule are treated as one logical attribute. In the use of goal-driven inference, the inference engine continues until the output attribute gets a value, or values in cases in which the goal is more than one output attribute. For clarity of presentation, the examples herein illustrate cases in which the goal is that one output attribute is to get a value.

Continuing to refer to FIG. 7, in illustration of operation 702 and continuing the textile-based example used to illustrate operations 400 and 402 as shown in FIG. 4, accepting input regarding circumstance data according to a goal-driven approach may begin with a determination of which logic business rules in the rule set must be checked. This determination may be performed using the application processor 112, the application memory 114, the knowledge base processor 102, and the knowledge base memory 104 as depicted in FIG. 1.

In this example illustrating operation 702, a rule in the rule set, called "rule 195" (not shown in FIG. 7) for purposes of this example, is relevant. Further, input regarding circumstance data to determine six conditions, the answers to six questions, are required for "rule 195" to provide an attribute to yield a result, the six conditions being:

(1) identification of "manufacturing type" as "textiles and textile products";
(2) answer to the question, "Are you selling to hotels, clubs, conference halls, restaurants, etc.?" as "yes";
(3) the product of interest does not use the flame retardant chemical PentaBDE;
(4) no use the product of interest of any of the chemicals in a provided list in;
(5) identification of the "product sub-specification" from a list of three specific items ("17.2, textile weaving" "17.53, non-wovens, except apparel"; "17.60, manufacture of knitted and crotchet fabrics"); and
(6) identification of the end use material as "upholstered furniture."

"Rule 195" is structured as follows:
IF the six conditions listed above are met,
THEN "Law DA" is applicable.

Prompts for the input required to use "rule 195" may be presented and input regarding circumstance data answering those questions may be accepted via the interface 108 and the interface computer 110 sequentially or in combination. According to "rule 195," if these six answers are included in the input regarding circumstance data, "Law DA" is determined to be applicable.

If any of the six answers is not as described, for example, if the "manufacturing type" is not "textiles and textile products" or if the answer to "Are you selling to hotels, clubs, conference halls, restaurants, etc.?" is "no," the remaining conditions are not checked, and the next logic business rule in the rule set to be checked is determined according to the priority scheme being used. The remaining conditions may be checked and the next logic business rule determined using the application processor 112, the application memory 114, the knowledge base processor 102, and the knowledge base memory 104 shown in FIG. 1. In this example, that rule is a ruled in the rule set called "Rule 205," and it is checked using the application processor 112, the application memory 114, the knowledge base processor 102, and the knowledge base memory 104.

Continuing the example illustrating operation 702, another rule in the rule set, called "rule 205" for purposes of this illustration (not shown in FIG. 7), requires input regarding circumstance data to determine a condition, e.g., collectively the answers to two questions, to provide an attribute to an additional relevant rule, the condition being: identification of the "manufacturer type" as "not elsewhere classified"; and identification of the material as "mattresses."

"Rule 205" is structured as follows:
IF the condition listed above is met,
THEN "Law DA" is applicable.

Prompts for this input may be presented, and inputs for answers accepted, via interface 108 sequentially or together. If this condition is included in the input regarding circumstance data, "Law DA" is determined to be applicable according to "rule 205," using the application processor 112, the application memory 114, the knowledge base processor 102, and the knowledge base memory 104 as depicted in FIG. 1.

The preceding example illustrates operation 702, accepting the input regarding circumstance data according to a goal-driven approach. Continuing to refer to FIG. 7, in a second illustration of operation 702, and continuing in part the textile-based example used to illustrate operations 400 and 402 shown in FIG. 4, accepting input regarding circumstance data according to a goal-driven approach may begin with a determination of which logic business rules in the rule set must be checked. Such determination may be performed using the application processor 112, the application memory 114, the knowledge base processor 102, and the knowledge base memory 104 as depicted in FIG. 1.

In this second example illustrating operation 702 of FIG. 7, a rule in the rule set called "rule 234a" for purposes of this example (not shown in FIG. 7), is relevant, and input regarding circumstance data to determine five conditions (the answers to five questions) are required for "rule 234a" to provide an attribute to yield a result, the five conditions being:
(1) identification of manufacturing type as "textiles and textile products";
(2) answer to the question, "Are you selling to hotels?" as "yes";
(3) the product of interest does not use the flame retardant chemical PentaBDE;
(4) no use in the product of interest of any chemicals in a provided list; and
(5) the product sub-specification is "17.40/1, manufacture of soft furnishings"

"Rule 234a" is structured as follows:
IF the five conditions listed above are met,
THEN infer that there is a need to present Question Q-D2.

Prompts for the input required to use "rule 234a" may be presented and input regarding circumstance data answering those questions may be accepted via the interface 108 and the interface computer 110 sequentially or in combination. According to "rule 234a," if these five answers are included in the input regarding circumstance data, a question, called "Question Q-D2" for purposes of this example, is to be presented. The inference of the THEN clause of "rule 234a" is assigned an internal attribute.

If any of the five answers required by "rule 234a" are not as described, for example, if there is a use of one or more of the chemicals in the list of condition (4), the remaining conditions are not checked and the next rule to be checked in the priority scheme being used is determined. This determination may be performed using the application processor 112, the application memory 114, the knowledge base processor 102, and the knowledge base memory 104 depicted in FIG. 1. In this example illustrating operation 702 of FIG. 7, however, the five answers required by "rule 234a" are included in the input regarding circumstance data, and it is inferred that the Question Q-D2 is to be presented. An inference of the need to present the Question Q-D2 is a condition for another rule called "rule 234b" for purposes of this example (not shown in FIG. 7). "Rule 234b" may be checked using the application processor 112, the application memory 114, the knowledge base processor 102, and the knowledge base memory 104 depicted in FIG. 1.

The conditions that "Rule 234b" requires to be met are as follows:
(1) a need to present the Question Q-D2 is inferred;
(2) the product of interest is "curtains or drapes";
(3) the product of interest is not ignited [in an ignition test];
(4) the product of interest includes a thread from a first thread maker and is assigned a particular value [e.g., yes or no] as a result of a specific test [e.g., the first maker thread is assigned the value yes if it breaks at a particular force applied in a test, and no otherwise]; and
(5) the product of interest includes a thread from a maker other than the first thread maker.

"Rule 234b" is structured as follows:
IF the five conditions listed above are met,
THEN some result occurs.

The result of the THEN clause of "rule 234b" may include, for example, inference of a need to present another question or inference of a need to present a reference to a relevant law.

Prompts for the input required by "rule 234b," and inputs for answers may be accepted, via the interface 108 shown in FIG. 1, sequentially or together. If the condition (1) of the IF clause of "rule 234b" is met by the inference of the need to present the question Q-D2 (as it is in this example by the inference of the THEN clause of the "rule 234a"), and the conditions (2), (3), (4), and (5) of the IF clause of "rule 234b" are met by data included in the input regarding circumstance data, an internal or an output attribute (depending on whether the THEN clause of "rule 234b" leads to another rule or is the last inference, respectively) corresponding to the result of the THEN clause of "rule 234b" is inferred, and the result called for by the THEN clause of "rule 234b" is fired.

Figure 17:
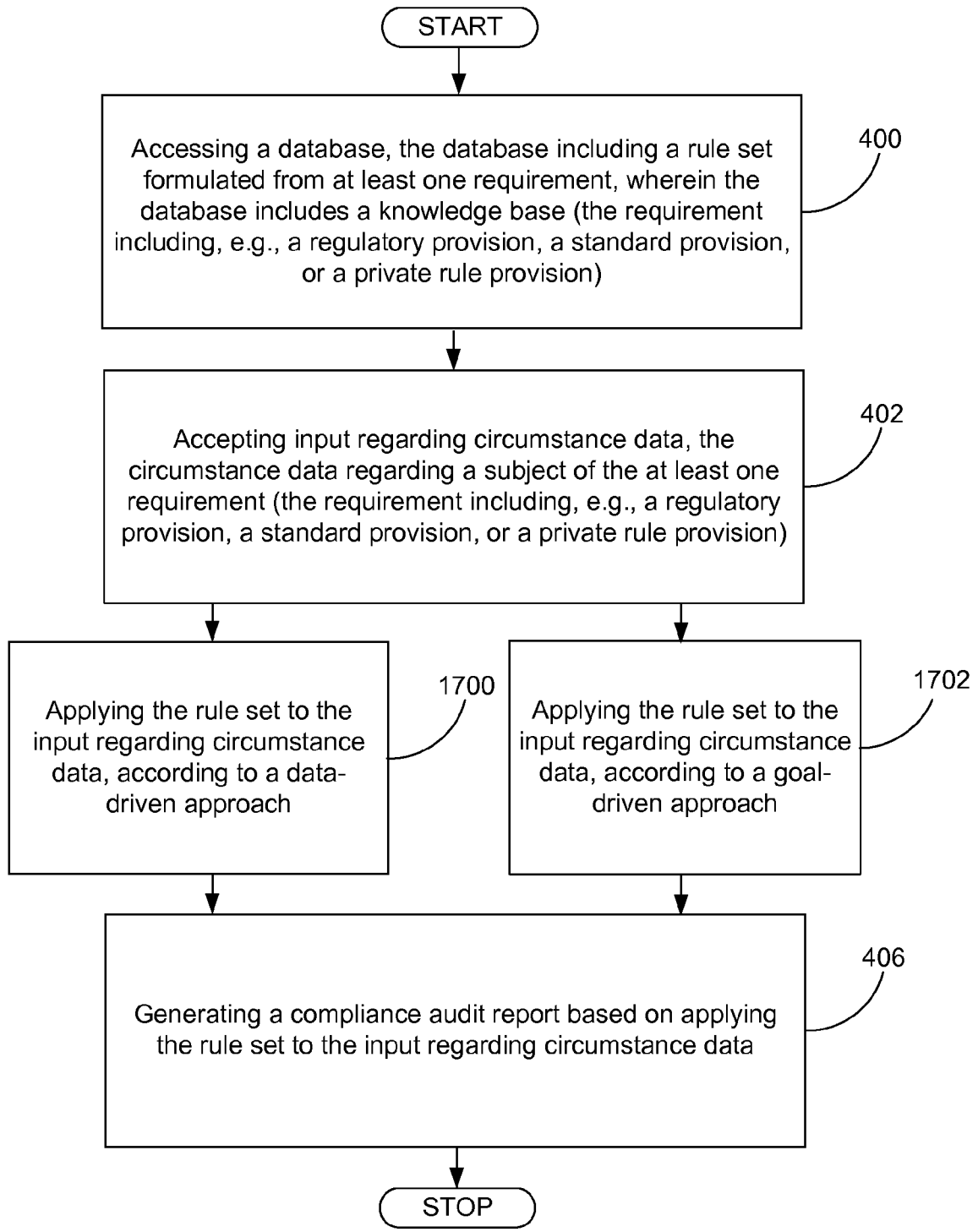
FIG. 17 shows a high-level logic flowchart of an operational process in accordance with some embodiments of the invention.

Referring to FIG. 17, a method for conducting a compliance audit is shown. The method includes one or more of the following operations: 400, 402, 404, and 406, which are described above in connection with FIG. 4. In addition, operation 404 may include one or more of the following operations: 1700 and 1702.

Operation 1700 depicts applying the rule set according to a data-driven approach. Operation 1700 may include applying the rule set according to a data-driven approach, wherein, for example, the application processor 112 and the application memory 114 as shown in FIG. 1 are used to apply the rule set to input regarding circumstance data provided by an end-user. The end-user may provide the input regarding circumstance data in response to one or more questions presented by hardware, software, firmware (or some combination of one or more of such hardware, software, and firmware) incorporated in whole or in part in the application processor 112 or the application memory 114, or both the application processor 112 and the application memory 114. In this example, an input regarding circumstance data in the form of an answer to a question results in the use of the application processor 112, the application memory 114, the knowledge base processor 102, and the knowledge base memory 104 to retrieve one or more logic business rules from the rule set. The answer to the question is used to select a further question or questions through the use of a decision tree as described above, of which the one or more logic business rules form one or more nodes, to solicit further input regarding circumstance data from the end-user.

Continuing to refer to FIG. 17, in illustration of operation 1700 and continuing the textile-based example used to illustrate operations 400 and 402, applying the rule set according to a data-driven approach may begin with an end-user beginning with accessing a rule set. The rule set may be included in the knowledge base 106 using the knowledge base processor 102 and the knowledge base memory 104 as shown in FIG. 1. In this example, a first rule of four rules is invoked, requiring input regarding circumstance data. These four rules are not shown in FIG. 17, but they are analogous to the rules 602, 612, 620, and 628 of the decision tree 600 as shown in FIG. 6 in terms of the rules' relationship to one another in a decision tree. The first rule (analogous to the rule 620 of FIG. 6) has this structure:
IF response to prompt, "manufacturer's type?" is "textile and textile products,"
THEN ask question, "Are you selling to hotels, clubs, conference halls, restaurants, etc.?"

This first rule requires input regarding circumstance data that indicates the "manufacturer's type," i.e., the type of product of interest to the end-user. A prompt for the "manufacturer's type" (not shown in FIG. 17; analogous to the Question Q1 606 of FIG. 6) is presented using the interface 108 of the interface computer 110 as shown in FIG. 1, and the end-user enters an answer, "textile and textile products" (not shown in FIG. 17; analogous to the Response AQ1 604 of FIG. 6) with the interface 108 of the interface computer 110 being used to accept the input.

Continuing reference to FIG. 17, according to the first rule, if the "manufacturer's type" is "textiles and textile products," then the first rule is fired. As a result, a second rule (not shown in FIG. 17; analogous to the rule 612 shown in FIG. 6)

requiring an answer to the question, "Are you selling to hotels, clubs, conference halls, restaurants, etc.?" (not shown in FIG. 17; analogous to the Question Q2 610 of FIG. 6), may be invoked. The second rule may be invoked using the application processor 112 executing instructions, the application memory 114, the knowledge base processor 102 executing instructions, and the knowledge base memory 104, as shown in FIG. 1. The prompt may be presented using the interface 108 of the interface computer 110 as shown on FIG. 1. The second rule has this structure:

IF the answer to the question, "Are you selling to hotels, clubs, conference halls, restaurants, etc.?" is yes,
THEN ask questions,
(1) "Did you use the flame retardant chemical PentaBDE?"; and
(2) "Did you use any flame retardant chemical of the following kinds? [presented with a list of flame retardant chemicals]."

This second rule requires input regarding circumstance data answering the question "Are you selling to hotels, clubs, conference halls, restaurants, etc.?" where the question is presented using the interface 108 of the interface computer 110 shown in FIG. 1. The end-user enters the answer "yes" (not shown in FIG. 17; analogous to the Response AQ2 614 shown in FIG. 6), and again the input is accepted using the interface 108 of the interface computer 110.

Continuing reference to FIG. 17, according to the second rule, if the question "Are you selling to hotels, clubs, conference halls, restaurants, etc.?" has been asked and the answer is "yes," then the second rule is fired. As a result, a third rule (not shown in FIG. 17; analogous to the Rule 620 shown in FIG. 6) requiring answers to two further questions, "Did you use the flame retardant chemical PentaBDE?" and "Did you use any flame retardant chemical of the following kinds? [presented with a list of flame retardant chemicals]," may be invoked. The third rule may be invoked using the application processor 112 executing instructions, the application memory 114, the knowledge base processor 102 executing instructions, and the knowledge base memory 104 illustrated in FIG. 1. The questions may be presented using the interface 108 of the interface computer 110 shown in FIG. 1. The third rule has this structure:

IF the answer to the questions
(1) "Did you use the flame retardant chemical PentaBDE?"; and
(2) "Did you use any flame retardant chemical of the following kinds? [presented with a list of flame retardant chemicals]," are
"no" and "no use of any of the chemicals listed below," respectively,
THEN ask question, "[What is the] product sub-specification? [with a presentation of a list of textile products and uses of textiles]."

Continuing to refer to FIG. 17, the end-user enters the respective answers "no" and "no use of any of the chemicals listed below," as input regarding circumstance data, and the interface 108 of the interface computer 110 may be used to accept the input. According to the third rule, if the questions "Did you use the flame retardant chemical PentaBDE?" and "Did you use any flame retardant chemical of the following kinds?" [presented with a list of flame retardant chemicals] have been asked and the respective answers are "no" and "no use of any of the chemicals listed below" (not shown in FIG. 17; taken together, the answers are analogous to the Response AQ3 622 shown in FIG. 6) then the third rule is fired. As a result, a fourth rule (not shown in FIG. 7; analogous to the rule 628 shown in FIG. 6) requiring an answer to the question, "[What is the] product sub-specification? [with a presentation of a list of textile products and uses of textiles]" (not shown in FIG. 7; analogous to the Question Q4 626 shown in FIG. 6), is asked. This question may be invoked using the application processor 112 executing instructions, the application memory 114, the knowledge base processor 102 executing instructions, and the knowledge base memory 104 shown in FIG. 1. The question may be presented using the interface 108 of the interface computer 110 shown in FIG. 1. The fourth rule has this structure:

IF the answer to the question, "[What is the] product sub-specification? [with a presentation of a list of textile products and uses of textiles]," is "carpets and rugs,"
THEN the law "EN 9239" is relevant.

This fourth rule may require input regarding circumstance data answering the further question, "[What is the] product sub-specification?" [with a presentation of a list of textile products and uses of textiles]. The interface 108 and the interface computer 110 may be used to accept the end-user's answer, "carpets and rugs."

Continuing with reference to FIG. 17, according to the fourth rule, if the question "[What is the] product sub-specification? [with a presentation of a list of textile products and uses of textiles]," has been asked and the answer "carpets and rugs" accepted, then the fourth rule is fired. As a result, the law "EN9239" (not shown in FIG. 17; analogous to the Output of Rule Inference 634 shown in FIG. 6) is inferred to be relevant using the application processor 112 executing instructions, the application memory 114, the knowledge base processor 102 executing instructions, and the knowledge base memory 104 depicted in FIG. 1. The law "EN9239" is inferred to be relevant by execution of the decision tree of which the four rules of this example illustrating operation 1700 are a part.

FIGS. 18, 19, 20, 21, 22, 23, 24, 25, and 26 depict screenshots of a Web browser (in this case, Microsoft Internet Explorer®) directed to a Web site of a compliance audit service vendor. This series of figures depicts successive stages of applying the rule set to the input regarding circumstance data. The descriptions of these figures are used herein to elaborate in detail the preceding example used to illustrate operation 1700 of FIG. 17.

Figure 18:
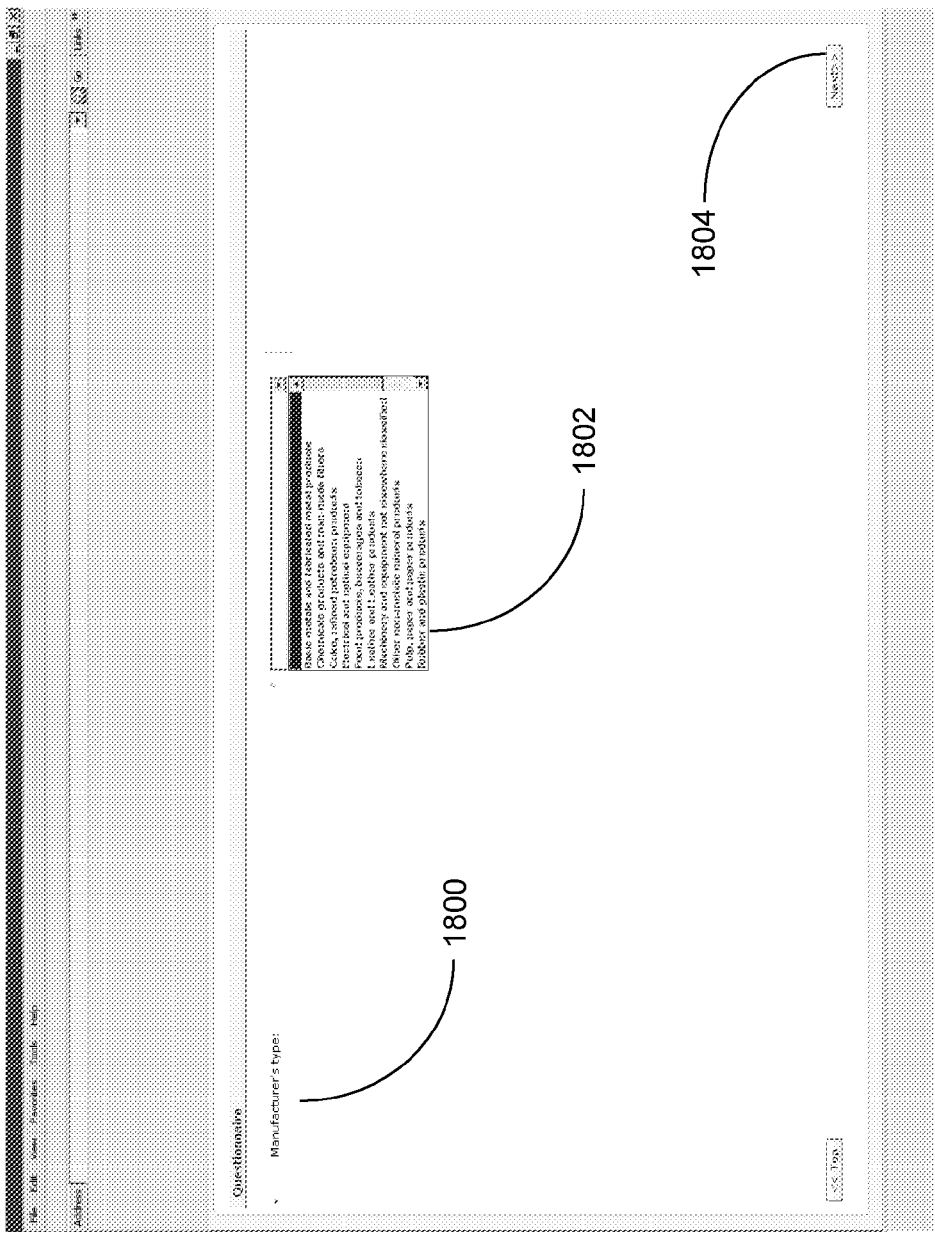
FIG. 18 shows an exemplary screenshot of a Web browser interface for accepting input regarding circumstance data, specifically a prompt for the type of manufacturer for which a compliance audit is sought, in accordance with some embodiments of the invention.
Figure 19:
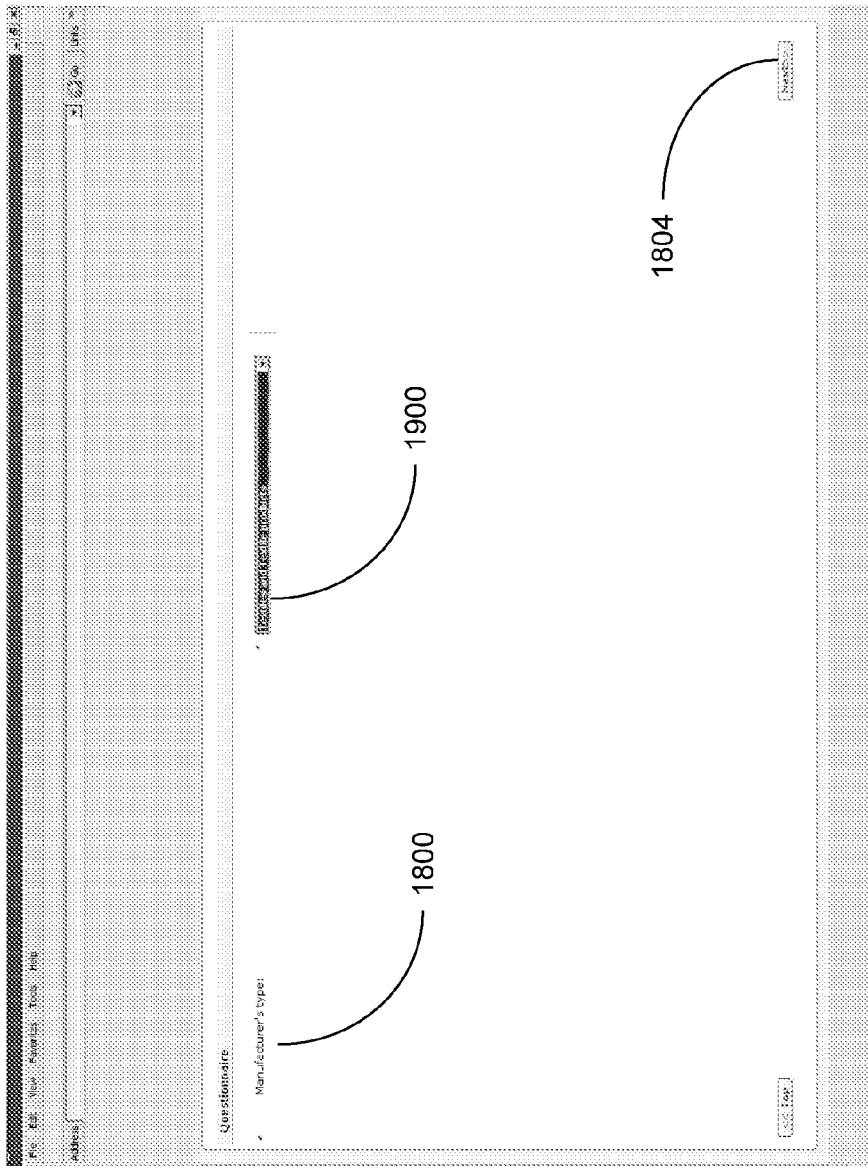
FIG. 19 shows an exemplary screenshot of a Web browser interface for accepting input regarding circumstance data, specifically showing designation of a specific choice of a type of manufacturer, in accordance with some embodiments of the invention.

Turning now to FIG. 18, an exemplary screenshot of a Web browser directed to a Web site of a compliance audit service vendor is illustrated. Generally, a graphical user interface, of which the screenshot depicted in FIG. 18 is an example, may present one or more prompts for an end-user to enter an answer to a question or other request for input, where the prompts may be mandatory or optional. The end-user may select a response from, for instance, a dropdown menu and input the selected information by, for instance, engaging an onscreen "next" button. Successive presentations, such as a series of Web browser screens, may be made until a result of an audit, such as a reference to or a text of a relevant regulation, is presented to an end-user. In addition, an option for the end-user to navigate through the business rules activated by the compliance audit may be presented upon, for example, engagement of a "how" button of the presented Web page. In the specific screenshot illustrated in FIG. 18, a prompt 1800 for a user to enter the "manufacturer's type" is presented with a dropdown menu 1802 via the Web browser using the interface 108 of the interface computer 110 shown in FIG. 1, in accordance with the first of four rules of the example used herein to illustrate operation 1700. The prompt presents possible manufacturer's types, e.g., "basic metals and fabricated metal products," "leather and leather products," "textiles and textile products" (an option not shown in FIG. 18), and so forth. The exemplary screenshot of FIG. 18 also includes a "next" button 1804. Referring to FIG. 19, an exemplary screenshot is depicted in which the "manufacture's type" "textiles and textile products" is the selection 1900. Once a selection is made, an end-user may proceed to the next screen by clicking the "next" button 1804.

Figure 20:
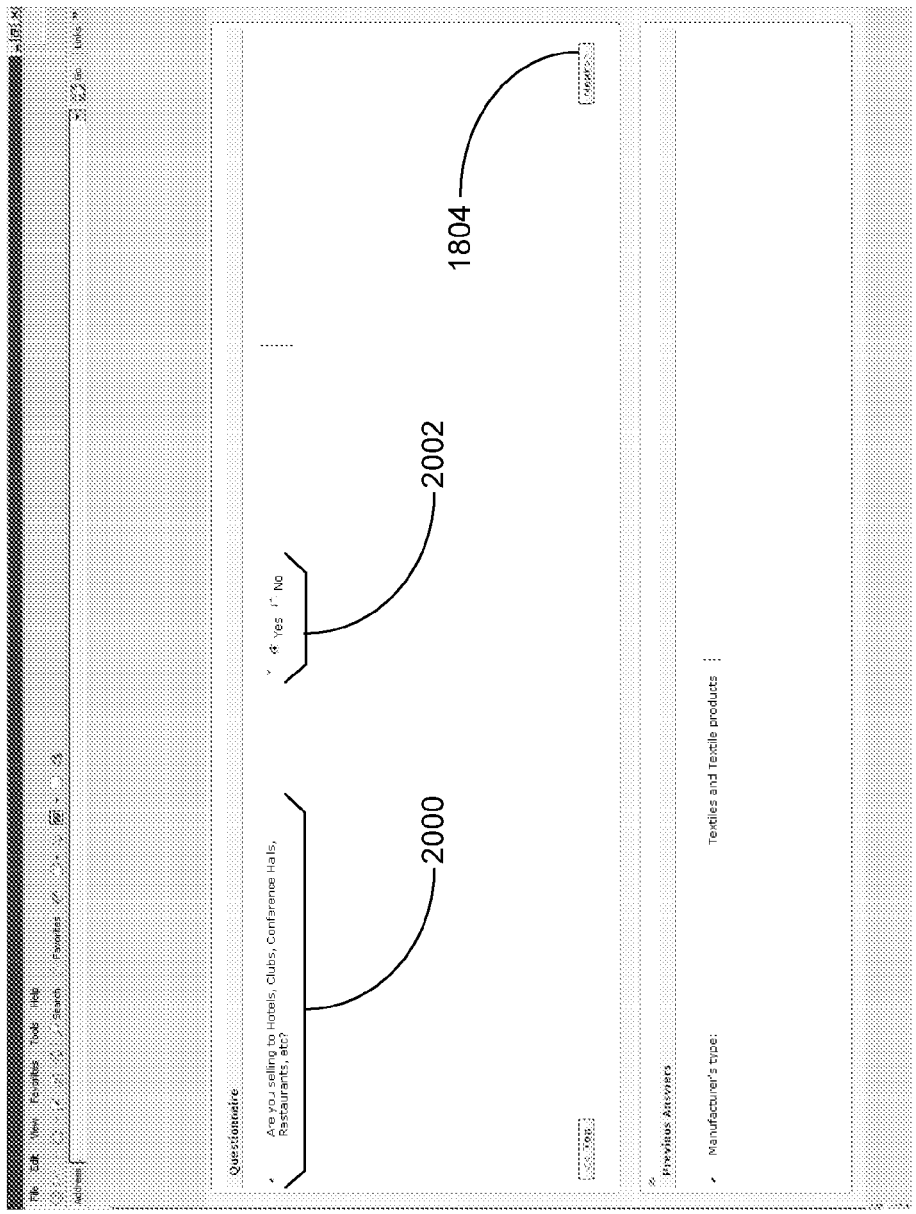
FIG. 20 shows an exemplary screenshot of a Web browser interface for accepting input regarding circumstance data, specifically an affirmation of a specific choice, in accordance with some embodiments of the invention.

Turning now to FIG. 20, an exemplary screenshot is depicted presenting a prompt 2000 for a user to enter a response to the question, "Are you selling to hotel, clubs, conference halls, restaurants, etc.?" in accordance with the second of four rules of the example used herein to illustrate operation 1700. The available choices 2002 are "yes" and "no." In the exemplary screenshot of FIG. 20, the answer "yes" has been selected.

Figure 21:
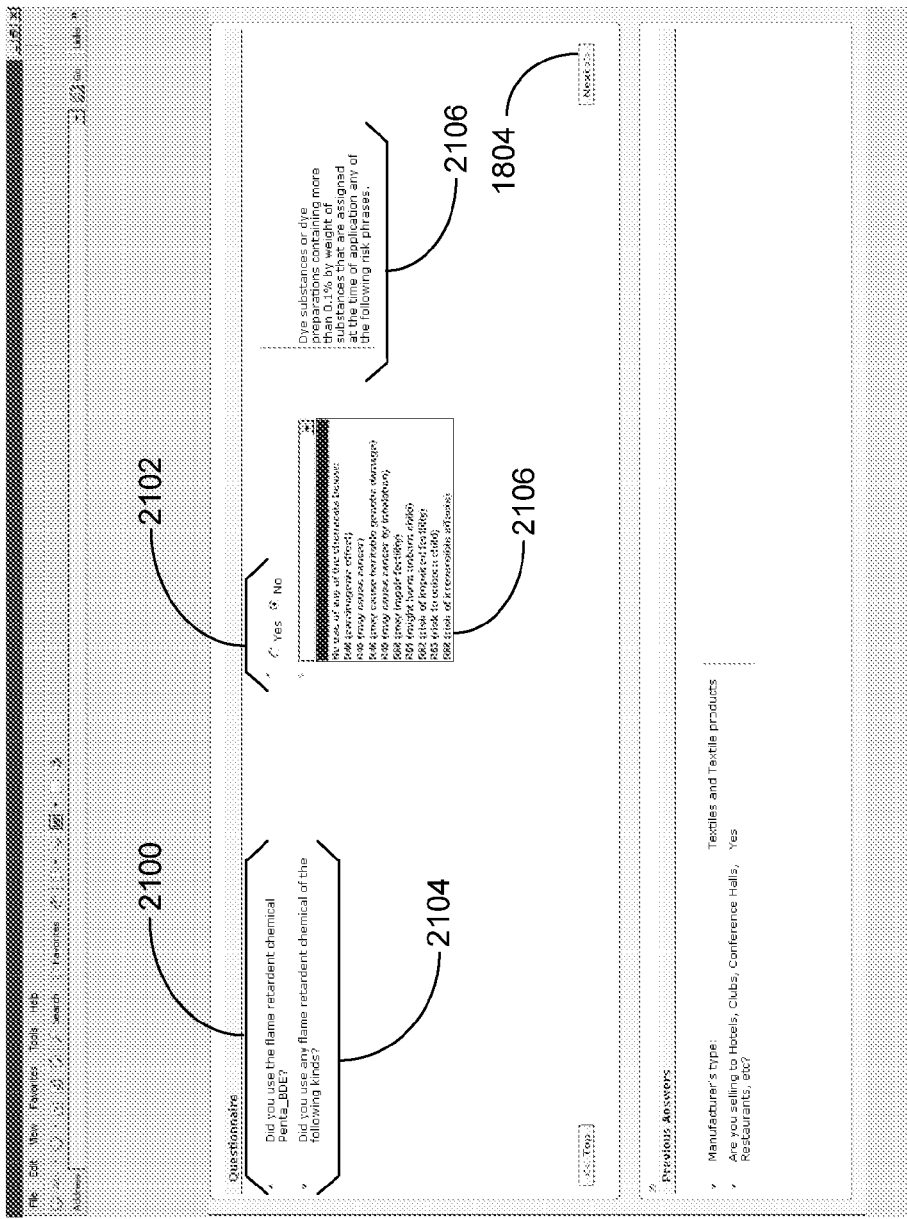
FIG. 21 shows an exemplary screenshot of a Web browser interface for accepting input regarding circumstance data, specifically a response to a question, in accordance with some embodiments of the invention.
Figure 22:
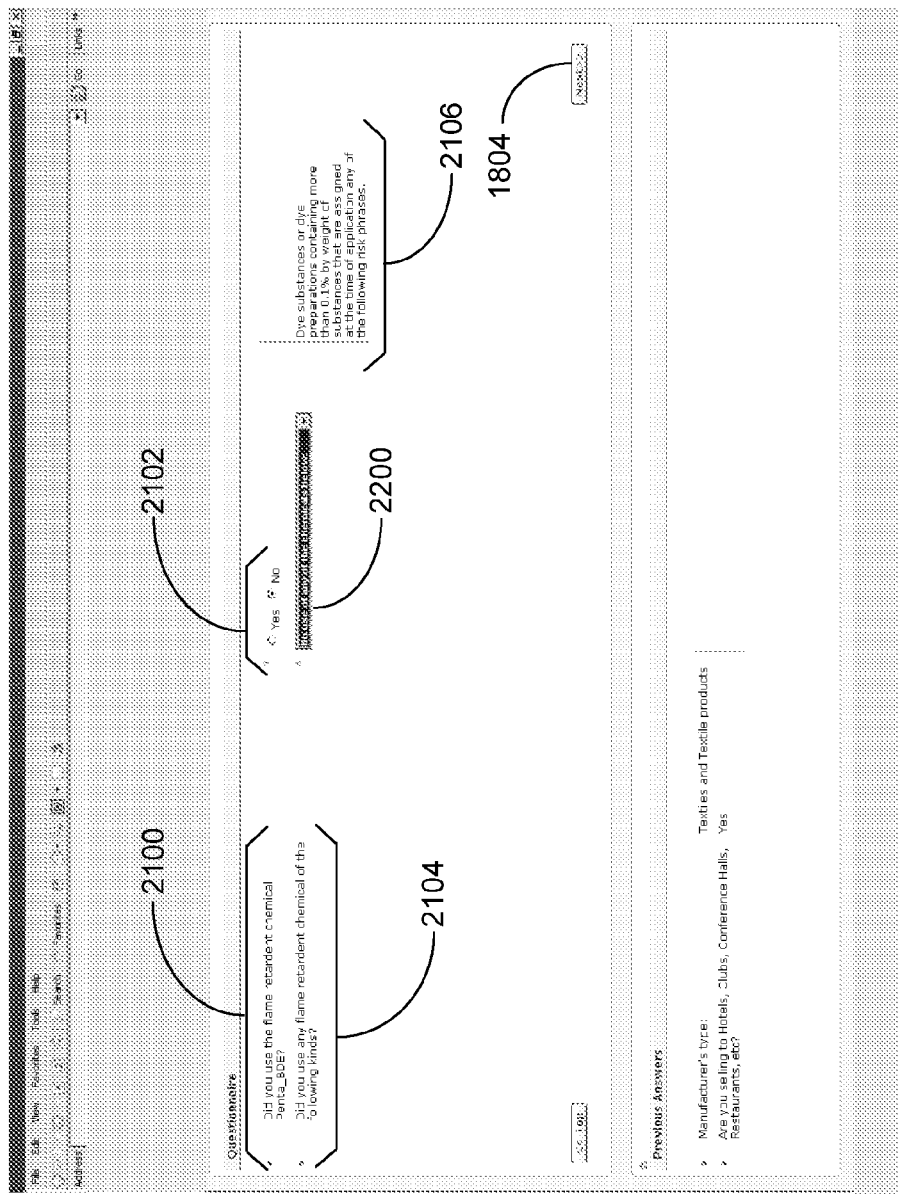
FIG. 22 shows an exemplary screenshot of a Web browser interface for accepting input regarding circumstance data, specifically a response to a question, in accordance with some embodiments of the invention.

Turning now to FIG. 21, an exemplary screenshot is shown presenting, in accordance with the third of four rules of the example used herein to illustrate operation 1700, a prompt 2100 for a user to enter a response to the question, "Did you use the flame retardant chemical PentaBDE?" The available responses 2102 are "yes" and "no." Further, the exemplary screenshot presents a prompt 2104 for a user to enter a response to the question "Did you use any flame retardant chemical of the following kinds?" along with a dropdown menu 2106 including a list of possible answers such as "R40 (carcinogenic effect)," "R60 (may impair fertility)," "no use of any of the chemicals below," and so forth. In connection with the question, "Did you use any flame retardant chemical of the following kinds?" and its possible responses, the exemplary screenshot features an explanatory note 2108, "Dye substances or dye preparations containing more than 0.1% by weight of substances that are assigned at the time of application any of the following risk phrases." The exemplary screenshot of FIG. 21 shows that the response "no" has been selected for the question, "Did you use the flame retardant chemical PentaBDE?" while no response has been selected for the question, "Did you use any flame retardant chemical of the following kinds?" Turning now to FIG. 22, an exemplary screenshot showing that the response 2102 "no" has been selected for the question of prompt 2100, "Did you use the flame retardant chemical PentaBDE?" and the response "no use of any of the chemicals below" has been selected from the dropdown menu 2106 for the question of prompt 2104, "Did you use any flame retardant chemical of the following kinds?"

Figure 23:
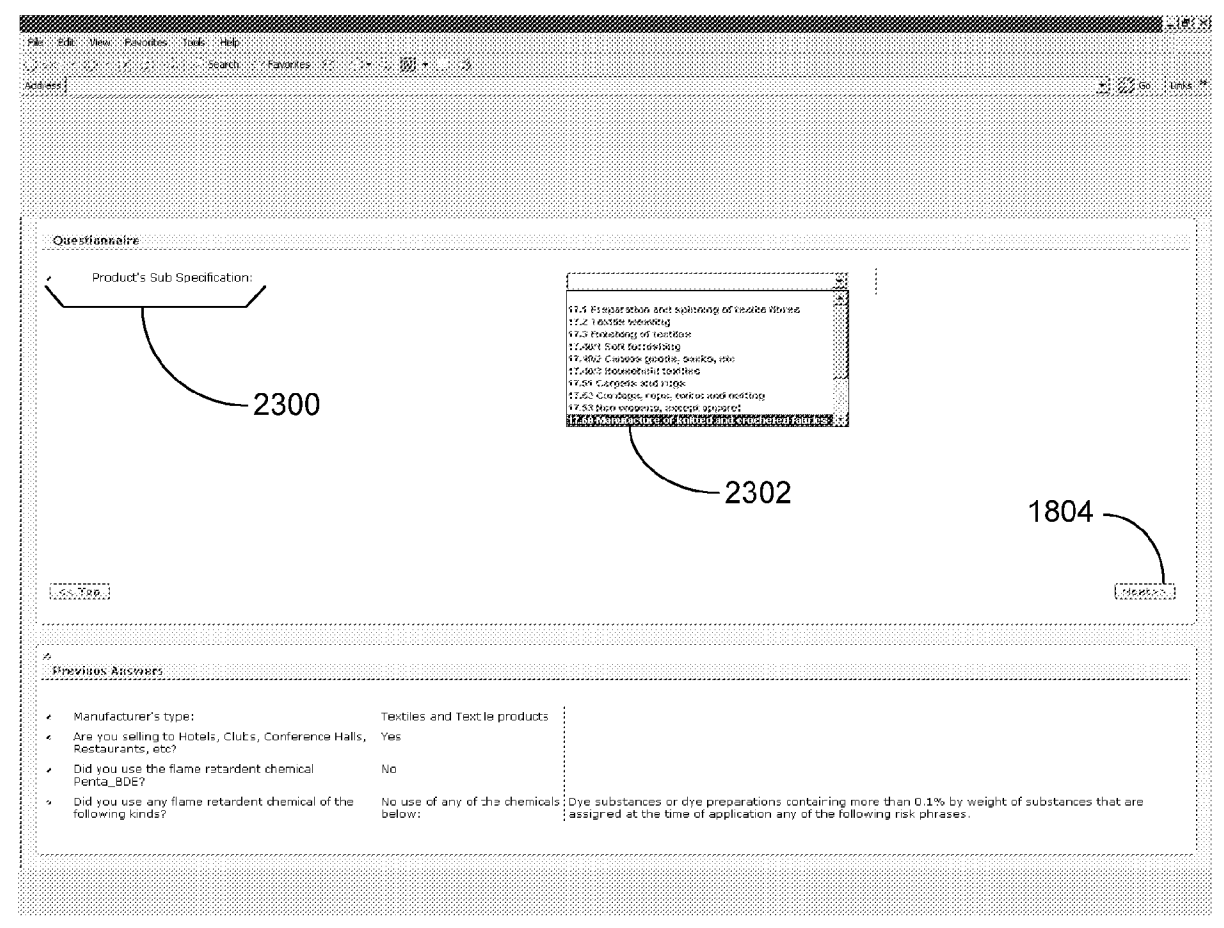
Figure 24:
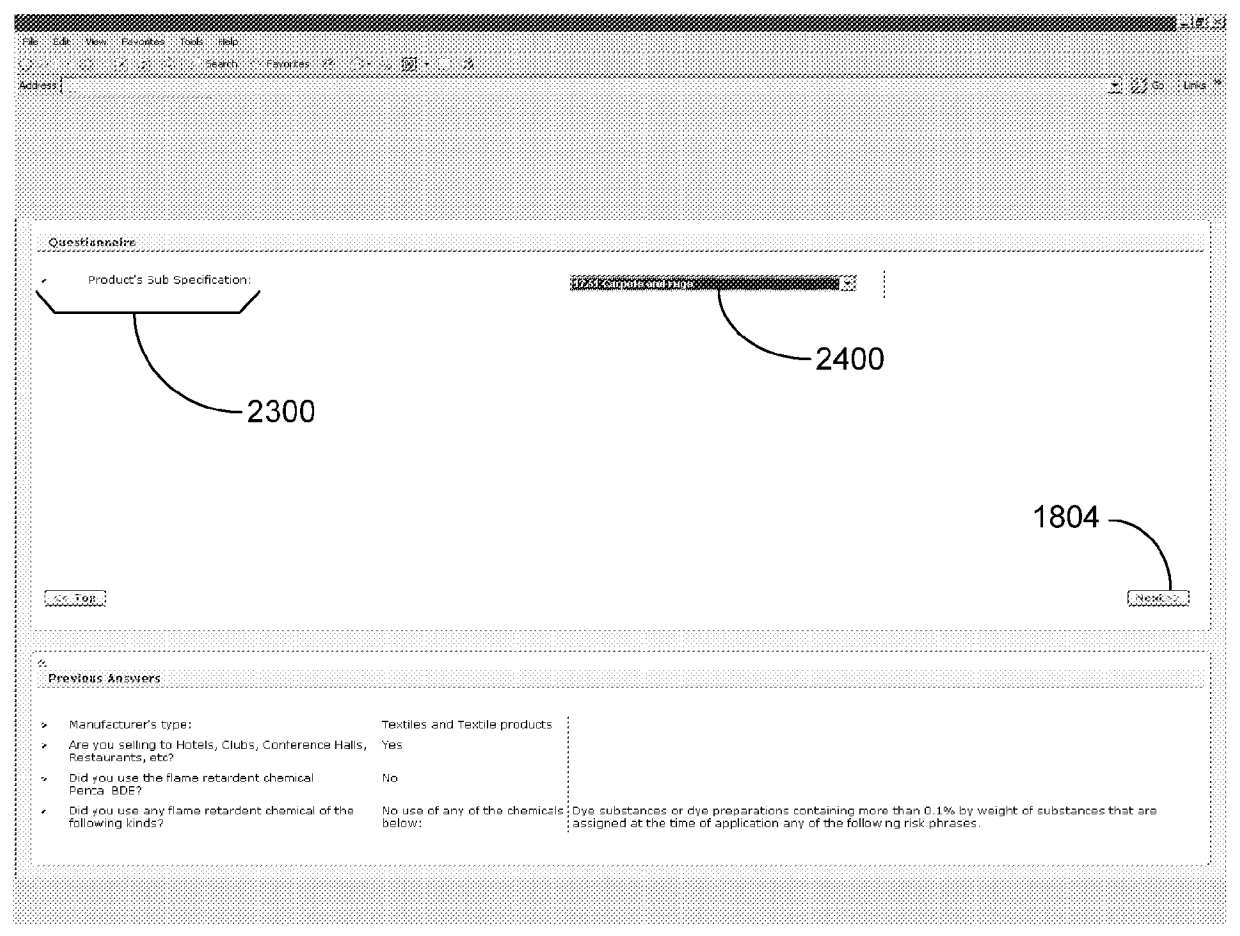

Referring to FIG. 23, an exemplary screenshot is shown presenting a prompt 2300 for a user to enter a response to specify a "product's sub-specification" to answer the question "[What is the] product sub-specification?" in accordance with the fourth of four rules of the example used herein to illustrate operation 1700. The exemplary screenshot also presents a dropdown menu 2302 with a list of possible responses such as "17.1 Preparation and spinning of textile fibres," "17.51 Carpets and rugs," and so forth. Turning now to FIG. 24, FIG. 24 illustrates an exemplary screenshot showing that the response 2400 "17.51 Carpets and rugs" has been selected as the response to the question of prompt 2300 "[What is the] product sub-specification?"

Figure 25:
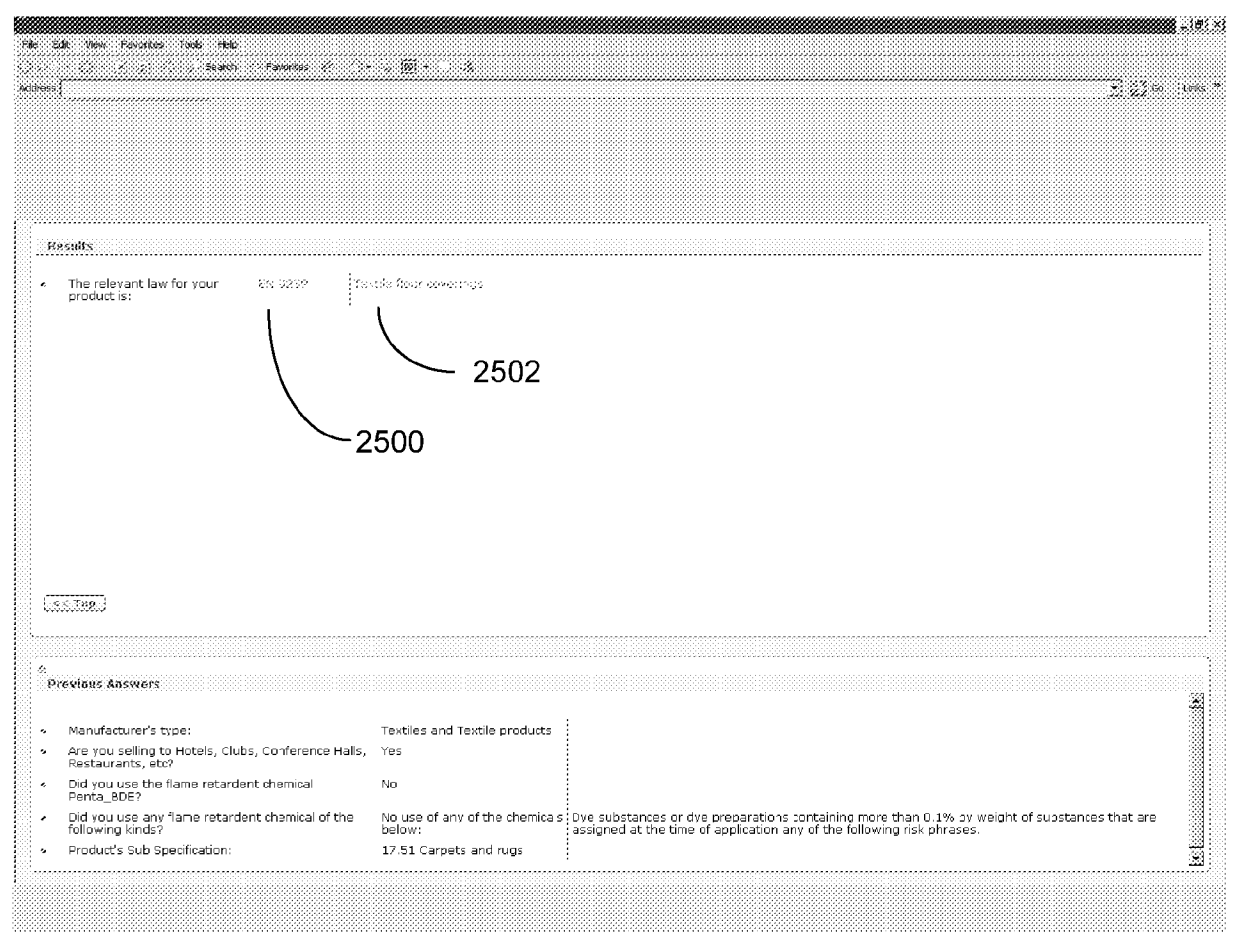
Figure 26:
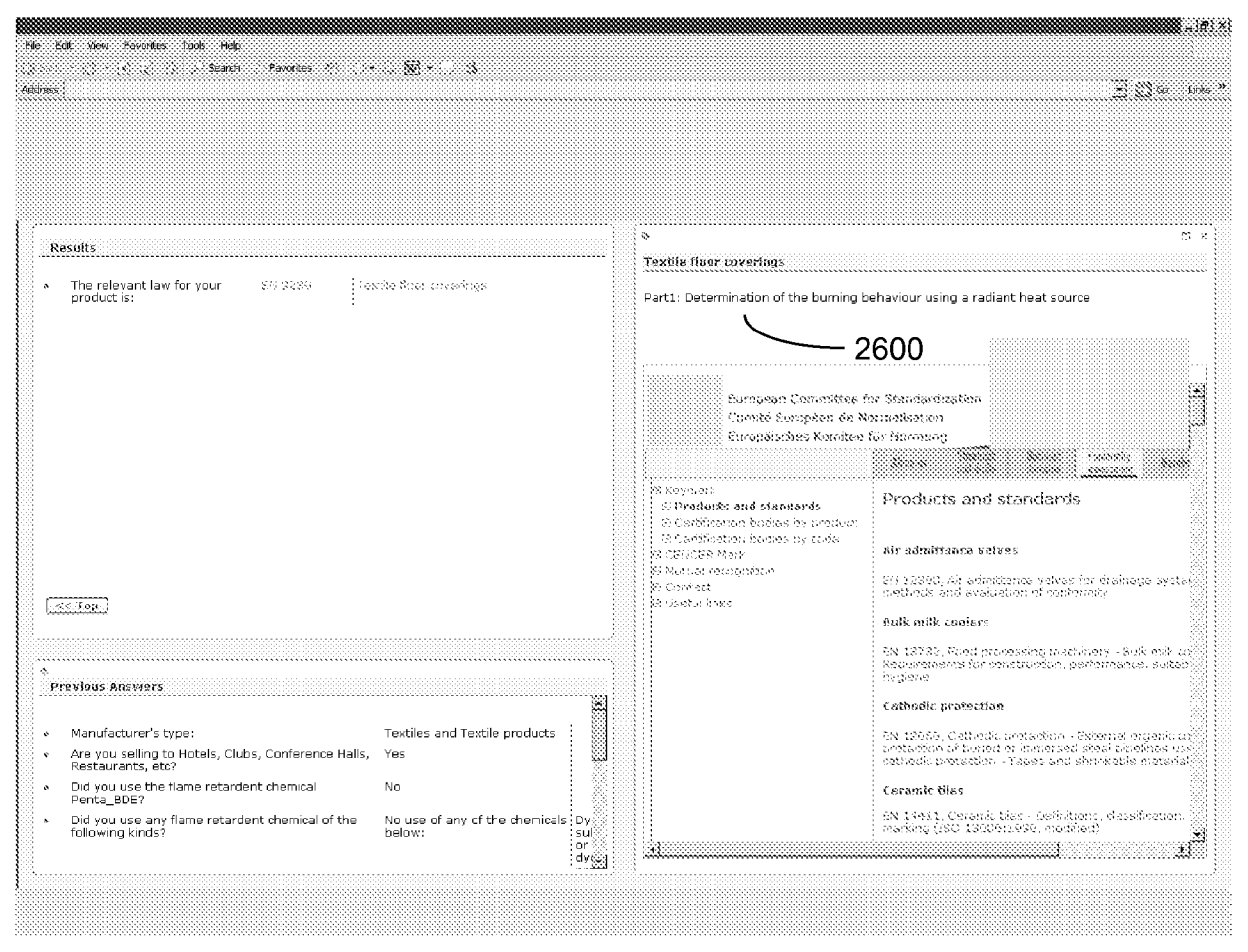

Turning now to FIG. 25, an exemplary screenshot is shown in which a reference 2500 to the law "EN9239" is presented along with a caption 2502 associated with the law "EN9239," "textile floor coverings" in accordance with the determination of the relevance of the law "EN9239" by the execution of the four-rule decision tree used herein to illustrate operation 1700. Turning now to FIG. 26, an exemplary screenshot is shown, in which a text 2600 associated with the law "EN9239" is presented, e.g., the text of the law or a commentary on the law.

The preceding exemplary four-rule decision tree execution and screenshots illustrate operation 1700 of FIG. 17, applying the rule set according to a data-driven approach. Continuing to refer to FIG. 17, operation 1702 illustrates applying the rule set according to a goal-driven approach. Operation 1702 may include applying the rule set according to a goal-driven approach, wherein for example, hardware, software, firmware or some combination of one or more of such hardware, software, and firmware) incorporated in whole or in part in the application processor 112 or the application memory 114 depicted in FIG. 1, or both the application processor 112 and the application processor 114, is used to apply rules in the rule set to input regarding circumstance data. In this example, the goal is to apply relevant particular regulatory or technical standard provisions to the input regarding circumstance data. Hardware, software, or firmware incorporated in whole or in part in the application processor 112 or the application memory 114 depicted in FIG. 1 check attributes of particular regulatory or technical standard provisions one by one. This checking may be performed according to a priority mechanism, and attempts to assign values to those attributes may be performed, by checking the logic business rules in the rule set that provide values for the attributes. The priority mechanism may include a priority scheme developed by one or more human actors such as a rule expert or an end-user, or a priority scheme based on statistics reflecting past occurrences of attributes, or a priority scheme designed to minimize the number or questions required to reach the desired result. For each logic business rule, all of the rule conditions are checked in the order the conditions occur in the syntax of the rule. If a given logic business rule requires that an additional rule provide an attribute, the additional rule is checked in a similar manner. If an attribute requires input regarding circumstance data, one or more questions are presented to prompt input regarding circumstance data for an end-user. The required input regarding circumstance data is prompted for and accepted until all relevant logic business rules from the rule set may be checked, and in being checked, applied to the input regarding circumstance data.

Continuing to refer to FIG. 17, in illustration of operation 1702 and continuing in part the textile-based example used to illustrate operations 400 and 402 as shown in FIG. 4, accepting input regarding circumstance data according to a goal-driven approach may begin with a determination of which logic business rules in the rule set must be checked. This determination may be performed using the application processor 112, the application memory 114, the knowledge base processor 102, and the knowledge base memory 104 depicted in FIG. 1.

In this example illustrating operation 1702, a rule in the rule set called "rule 195" for purposes of this example, is relevant. Further, input regarding circumstance data to determine six conditions, the answers to six questions, are required for "rule 195" to provide an attribute to yield a result, the six conditions being:

(1) identification of "manufacturing type" as "textiles and textile products";
(2) answer to the question, "Are you selling to hotels, clubs, conference halls, restaurants, etc.?" as "yes";
(3) the product of interest does not use the flame retardant chemical PentaBDE;
(4) no use in the product of interest of any of the chemicals in a provided list;
(5) identification of the "product sub-specification" from a list of three specific items ("17.2, textile weaving" "17.53, non-wovens, except apparel"; "17.60, manufacture of knitted and crotchet fabrics"); and (6) identification of the end use material as "upholstered furniture."

"Rule 195" is structured as follows:

IF the six conditions listed above are met,

THEN "Law DA" is applicable.

Prompts for the input required to use "rule 195" may be presented and input regarding circumstance data answering those questions may be accepted via the interface 108 and the interface computer 110 sequentially or in combination. According to "rule 195," if these six answers are included in the input regarding circumstance data, "Law DA" is determined to be applicable.

If any of the six answers is not as described, for example, if the "manufacturing type" is not "textiles and textile products" or if the answer to "Are you selling to hotels, clubs, conference halls, restaurants, etc.?" is "no," the remaining conditions are not checked, and the next logic business rule to be checked in the priority scheme being used is determined. The remaining conditions may be checked and the next logic business rule determined using the application processor 112, the application memory 114, the knowledge base processor 102, and the knowledge base memory 104 shown in FIG. 1. In this example, that rule is a rule in the rule set called "Rule 205," and it is checked using the application processor 112, the application memory 114, the knowledge base processor 102, and the knowledge base memory 104.

Continuing the example illustrating operation 1702, another rule in the rule set, called "rule 205" for purposes of this illustration, requires input regarding circumstance data to determine a condition, e.g., collectively the answers to two questions, to provide an attribute to an additional relevant rule, the condition being: identification of the "manufacturer type" as "not elsewhere classified"; and identification of the material as "mattresses."

"Rule 205" is structured as follows:

IF the condition listed above is met,

THEN "Law DA" is applicable.

Concluding the example illustrating operation 1702, prompts for this input may be presented, and inputs for answers accepted, via interface 108 sequentially or together. If this condition is included in the input regarding circumstance data, "Law DA" is determined to be applicable according to "rule 205," using the application processor 112, the application memory 114, the knowledge base processor 102, and the knowledge base memory 104 depicted in FIG. 1.

In addition to the immediately preceding example illustrating the goal-driven approach of operation 1702 and involving "rule 195" and "rule 205," the example detailed herein in connection with operation 702 of FIG. 7, and featuring rules called "rule 234*a*" and "rule 234*b*" is also exemplary of operation 1702. That is, the goal-driven example featuring "rule 234*a*" and "rule 236*b*" also illustrates applying the rule set according to a goal-driven approach as shown in operation 1702.

Figure 27:
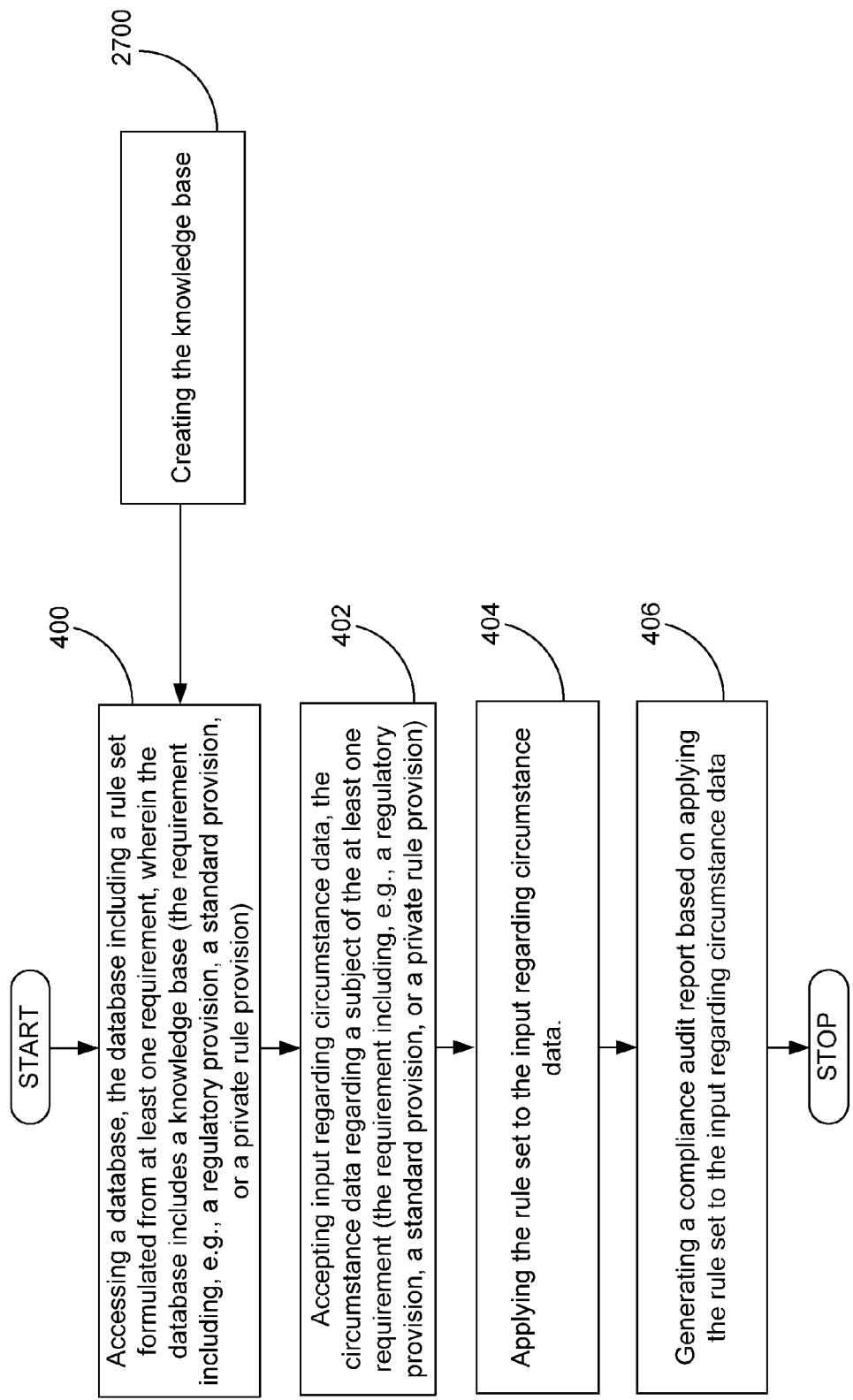
FIG. 27 shows a high-level logic flowchart of an operational process in accordance with some embodiments of the invention.

Referring now to FIG. 27, a method for conducting a compliance audit is shown. The method includes one or more of the following operations: 400, 402, 404, and 406, which are described elsewhere herein in connection with FIG. 4. The method illustrated in FIG. 27 also includes operation 2700, which illustrates creating the knowledge base. Creating the knowledge base as in operation 2700 may, for example, include storing the requirements of regulatory or technical standard provisions as rules expressed as logic business rules in the form of IF-THEN statements. Such requirements of regulatory or technical standards provisions may be made known, for example, through legal texts and compilations of commercial standards. These logic business rules are stored in, for instance, in the knowledge base memory 104 in a data structure, knowledge base 106 both as shown in FIG. 1, which allows their application to input regarding circumstance data in, for example, the form of a decision tree reflecting a hierarchical, top-down set of decision criteria. Creating the knowledge base as in operation 2700 includes storing one or more such logic business rules in a data structure such as the knowledge base 106 that previously included no such logic business rules.

Operation 2700 may include creating the knowledge base, wherein, for instance, a knowledge engineer, a rule expert, or an end-user uses the knowledge base processor 102, the knowledge base memory 104, the interface 108, and the interface computer 110 as shown in FIG. 1 to create the knowledge base 106, also as shown in FIG. 1. The knowledge engineer, the rule expert, or the end-user may create the knowledge base 108 by inputting data regarding (1) the EU's legal provisions governing the use of a particular textile in furnishings, (2) the EU's legal provisions governing the use of any textiles used in a particular furnishing, or both (1) and (2). Creating the knowledge base of operation 2700 may include creating the rule set which may be included in the knowledge base 106. Continuing the example used to illustrate operation 400 as shown in FIG. 4, operation 2700 may include a knowledge engineer or an end-user inputting data regarding (1) legal provisions of the EU and of the member states of the EU, governing textiles and textile products to be sold to establishments including hotels, clubs, conference halls, or restaurants, interpretations of those legal provisions, (2) cases illustrating the application of those legal provisions in specific circumstances, and (3) expert advice regarding those legal provisions. This data may include data representing the requirements of those EU legal provisions as rules expressed as logic business rules in the form of IF-THEN statements, such as a rule structured as follows:

IF the answer to the question, "[What is the] product sub-specification? [with a presentation of a list of textile products and uses of textiles]," is "carpets and rugs, THEN the law "EN 9239" is relevant.

Figure 28:
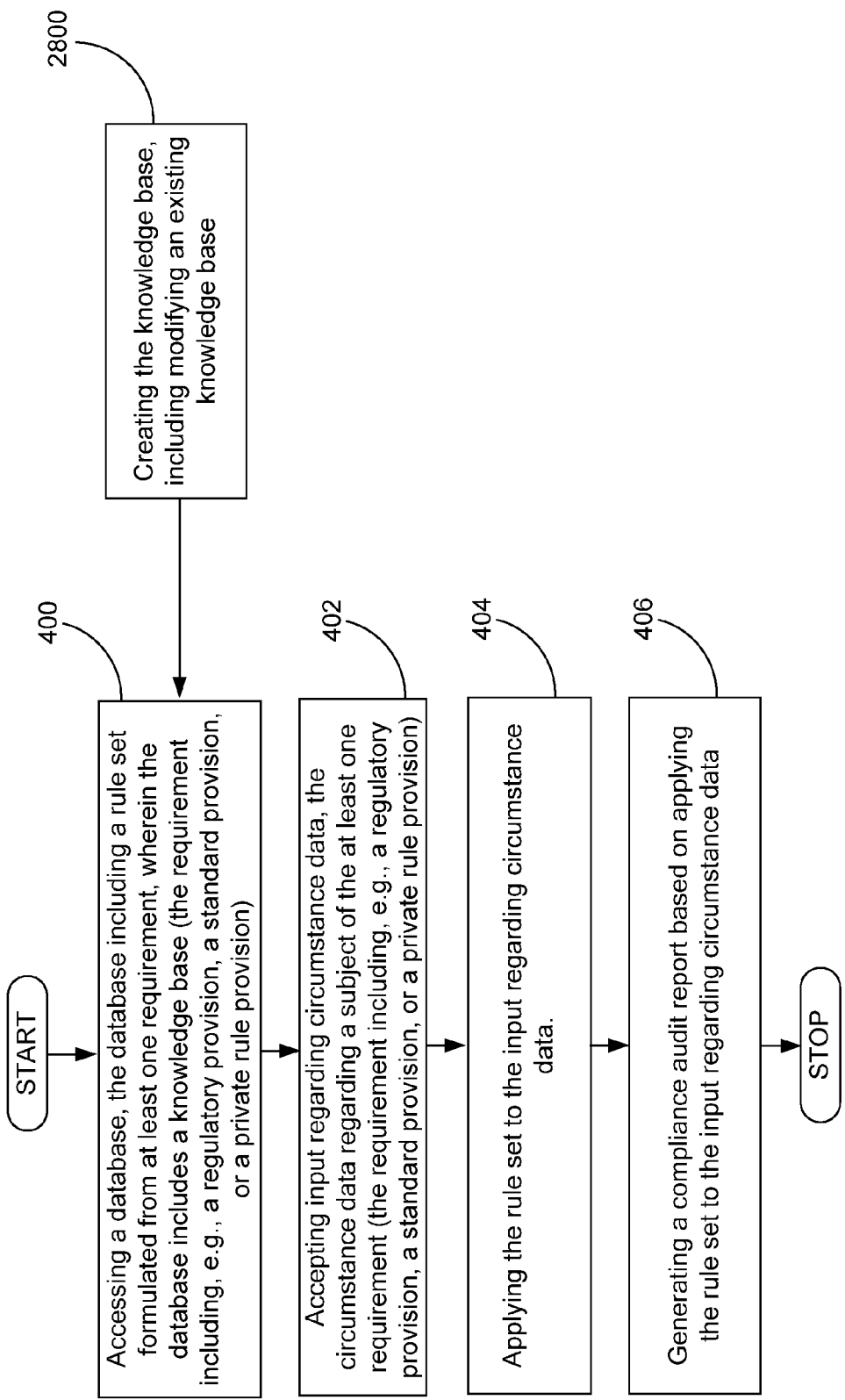
FIG. 28 shows a high-level logic flowchart of an operational process in accordance with some embodiments of the invention.

Referring now to FIG. 28, operation 2700 of FIG. 27 may include operation 2800. Operation 2800 illustrates modifying an existing knowledge base. Continuing the example of FIG. 27, modifying an existing knowledge data base as in operation 2800 may include adding one or more logic business rules in the form of IF-THEN statements to a data structure that already includes one or more such logic business rules. Operation 2800 may also include deleting one or more such rules from a data structure that already includes such rules. Operation 2800 may further include changing one or more logic business rules already included in such a data structure.

Operation 2800 may include, for example, modifying an existing knowledge base, wherein a knowledge expert or an end-user uses the knowledge base processor 102, the knowledge base memory 104, the interface 108, and the interface computer 110 shown in FIG. 1 to modify an existing knowledge base 106, also shown in FIG. 1, that already includes data. Such data may include data regarding (1) the EU's legal provisions governing the use of a particular textile in furnishings, (2) the EU's legal provisions governing the use of any textiles used in a particular furnishing, or both (1) and (2).

Continuing the example of FIG. 27, operation 2800 may include a knowledge engineer or an end-user inputting data representing (1) the requirements of legal provisions of the EU and of the member states of the EU governing textiles and textile products to be sold to establishments including hotels, clubs, conference halls, or restaurants, interpretations of those legal provisions, (2) cases illustrating the application of those legal provisions in specific circumstances, and (3) expert advice regarding those legal provisions. These data may be in the form of IF-THEN statements for storage in the knowledge base 106, where the knowledge base 106 includes data representing such logic business rules prior to performance of operation 2800. Operation 2800 may include (1) adding a logic business rule to the rule set included in knowledge base 106, (2) deleting a logic business rule from the rule set included in knowledge base 106, or (3) changing a logic business rule included in the rule set included in knowledge base 106, such as a rule structured as follows:

IF the answer to the question, "[What is the] product sub-specification? [with a presentation of a list of textile products and uses of textiles]," is "carpets and rugs," THEN the law "EN 9239" is relevant.

Figure 29:
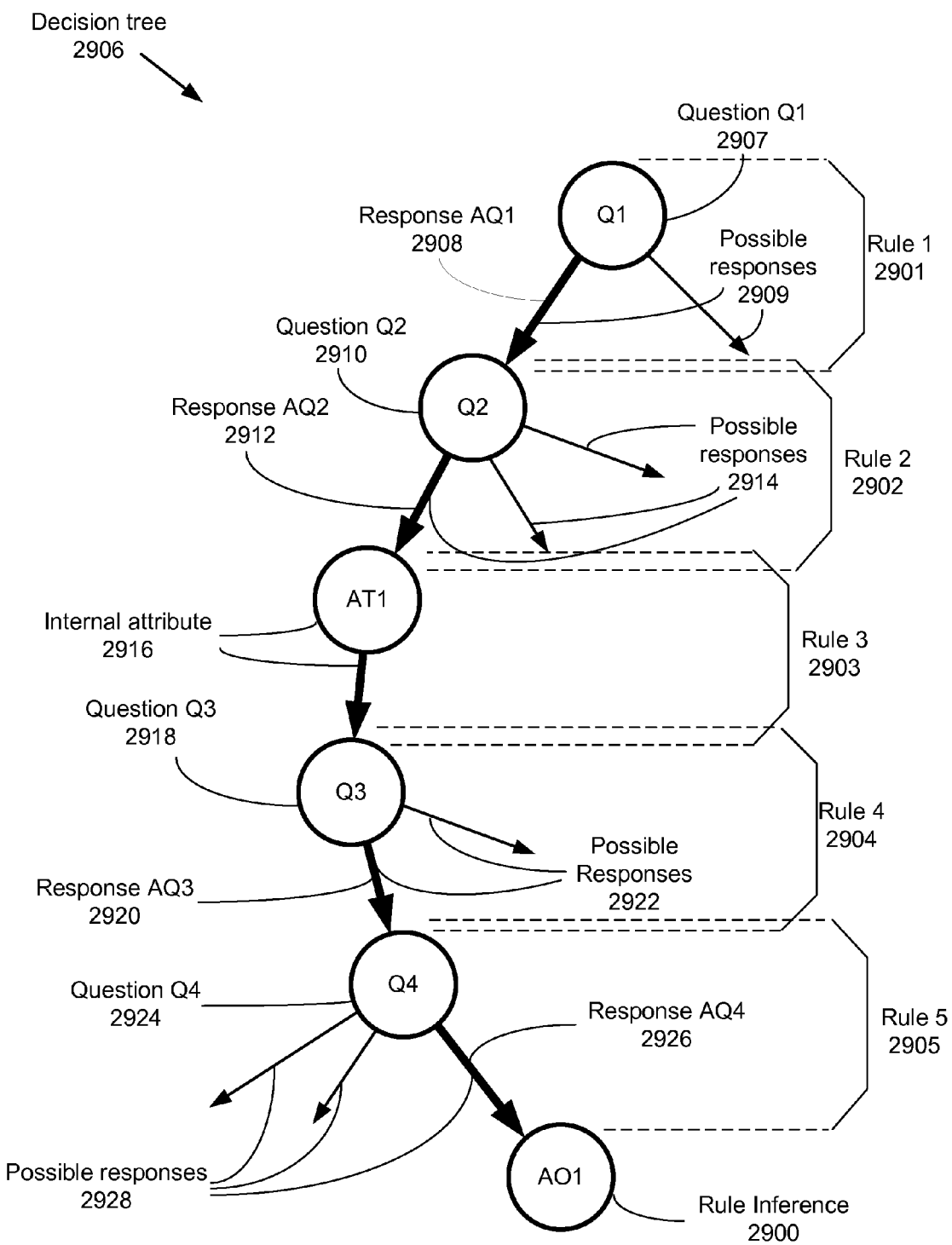
FIG. 29 shows a decision tree for accepting input regarding circumstance data or for applying a rule set to input regarding circumstance data in accordance with some embodiments of the invention.

Turning now to FIG. 29, a goal-driven approach may be combined with a data-driven approach, as depicted in FIG. 29 and described in the following example. The goal-driven aspect of the combined approach is reflected in the goal of determining a particular result, and the data-driven aspect of the combined approach is reflected in the use of rules organized in a decision tree to determine the particular result. With reference to the goal-driven aspect of this example, the goal is to determine a result which is assigned an output attribute that is designated Output Attribute AO1 2900 for the purposes of this example.

With reference to the data-driven aspect of this example, five rules, called for purposes of this example Rule 1 2901, Rule 2 2902, Rule 3 2903, Rule 4 2904, and Rule 5 2905, are part of a decision tree 2906. In this example, Rule 5 2905 assigns to its result the output attribute AO1 2900. The decision tree links these rules as follows:

the condition of Rule 5 2905 requires Rule 4 2904;
the condition of Rule 4 2904 requires Rule 3 2903;
the condition of Rule 3 2903 requires Rule 2 2902; and
the condition of Rule 2 2902 requires Rule 1 2901.

In accordance with this combined approach, Question Q1 2907 is presented to an end-user via, for instance, an interface 108 of an interface computer 110, as shown in FIG. 1. A user may enter a response via the interface 108 of the interface computer 110, the response being assigned "value1" (not shown in FIG. 29). "Value1" as a response to Question Q1 2907 leads to the assignment of "value1" to the answer to Response AQ1 2908, one of two depicted possible responses 2909 to Question Q1 2907, and Rule 1 2901 is fired, that is, Rule 1 2901 is executed because its condition has been satisfied.

Rule 2 2902, the next rule in this exemplary decision tree and requiring Rule 1 2901, requires a response to Question Q2 2910, the Response AQ2 2912. The Response AQ2 2912 is one of three depicted possible responses 2914. Question Q2 2910 is presented to the end-user via, for instance, the interface 108 of the interface computer 110, shown in FIG. 1. A user may enter a response via the interface 108 of the interface computer 110, the response being assigned "value2" (not shown in FIG. 29). "Value2" as a response to Question Q2 2910 leads to the assignment of "value2" to the Response AQ2 2912, and Rule 2 2902 is fired, that is, Rule 2 2902 is executed because its condition has been satisfied. As a result of Rule 2 2902 firing, the temporary internal attribute AT1 2916 is inferred by the terms of Rule 3 2903, and Rule 3 2903 is fired, that is, Rule 3 2903 is executed because its condition has been satisfied.

Rule 4 2904, the next rule in this exemplary decision tree and requiring Rule 3 2903, requires a response to Question Q3 2918, the Response AQ3 2920. The Response AQ3 2920 is one of two depicted possible responses 2922 to Question Q3 2918. In accordance with the combined approach of this example, Question Q3 2918 is presented to the end-user via, for instance, the interface 108 of the interface computer 110 as shown in FIG. 1. A user may enter a response via the interface 108 of the interface computer 110, the response being assigned "value3" (not shown in FIG. 29). "Value3" as a response to Question Q3 2918 leads to the assignment of "value3" to the Response AQ3 2920, and Rule 4 2904 is fired, that is, Rule 4 2904 is executed because its condition has been satisfied.

Rule 5 2905, the next rule in this exemplary decision tree and requiring Rule 4 2904, requires a response to Question Q4 2924, the Response AQ4 2926. The Response AQ4 2926 is one of three depicted possible responses 2928 to Question Q4 2924. In accordance with the combined approach of this example, Question Q4 2924 is presented to the end-user via, for instance, the interface 108 of the interface computer 110 as shown in FIG. 1. A user may enter a response via the interface 108 of the interface computer 110, the response being assigned "value5" (not shown in FIG. 29). "Value5" as a response to Question Q4 2924 leads to the assignment of "value5" to the response to Response AQ4 2926, Rule 5 2905 is fired, that is, Rule 5 2905 is executed because its condition has been satisfied.

As a result of the firing of Rule 5 2905, a result designated rule inference AO1 2900 is inferred and is assigned a value of "value6" (not shown in FIG. 29). Inference of and assignment of "value6" to rule inference AO1 2900 is the desired goal of the combination of the goal-driven approach and the data-driven approach of the example illustrated in FIG. 29 and described herein.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An automated method for facilitating a compliance audit, the method comprising:
    accessing a database, the database including a rule set formulated from at least one requirement, wherein the database includes a knowledge base;
    at a data processing system, accepting input regarding circumstance data, the circumstance data regarding a subject of the at least one requirement;
    automatically applying the rule set to the input regarding circumstance data, by the data processing system; and
    automatically generating a compliance audit report by the data processing system, the compliance audit report based on applying the rule set to the input regarding circumstance data;
    wherein the circumstance data comprises:
        product class data to identify a general class of products for an item of manufacture; and
        at least one item from the group consisting of:
            product type data to identify a more specific type of product, within the general class of products, for the item of manufacture;
            product attribute data to identify a property of the item of manufacture; and
            customer data to identify a type of customer for the item of manufacture.

2. The method of claim 1, wherein
    the at least one requirement from which the rule set is formulated includes a regulatory provision.

3. The method of claim 1, wherein the at least one requirement from which the rule set is formulated includes a provision pertaining to an industry standard.

4. The method of claim 1, wherein the at least one requirement from which the rule set is formulated includes a private rule provision.

5. The method of claim 1, wherein the operation of accepting input regarding circumstance data comprises:
accepting input regarding a regulatory provision.

6. The method of claim 1, wherein the operation of accepting input regarding circumstance data comprises:
accepting input regarding a provision pertaining to an industry standard.

7. The method of claim 1, wherein the operation of accepting input regarding circumstance data comprises:
accepting input regarding a private rule provision.

8. The method of claim 1, wherein the operation of accepting input regarding circumstance data comprises:
accepting the input regarding circumstance data according to a data-driven approach.

9. The method of claim 1, wherein the operation of accepting input regarding circumstance data comprises:
accepting the input regarding circumstance data according to a goal-driven approach.

10. The method of claim 1, wherein applying the rule set to the input regarding circumstance data, further comprises:
applying the rule set according to a data-driven approach.

11. The method of claim 1, wherein applying the rule set to the input regarding circumstance data, further comprises:
applying the rule set according to a goal-driven approach.

12. The method of claim 1, further comprising:
creating the knowledge base.

13. The method of claim 12, wherein creating the knowledge base further comprises:
modifying an existing knowledge base.

14. A data processing system comprising:
at least one processor;
a non-transitory storage medium responsive to the at least one processor; and
instructions in the storage medium, wherein the instructions, when executed by the at least one processor, enable the data processing system to perform operations comprising:
accessing a database that includes a rule set formulated from at least one requirement, wherein the database includes a knowledge base;
accepting input regarding circumstance data, the circumstance data regarding a subject of the at least one requirement;
automatically applying the rule set to the input regarding circumstance data; and
automatically generating a compliance audit report based on applying the rule set to the input regarding circumstance data;
wherein the circumstance data comprises:
product class data to identify a general class of products for an item of manufacture; and
at least one item from the group consisting of:
product type data to identify a more specific type of product, within the general class of products, for the item of manufacture;
product attribute data to identify a property of the item of manufacture; and
customer data to identify a type of customer for the item of manufacture.

15. The system of claim 14, wherein the instructions, when executed by the at least one processor, enable the data processing system to perform further operations comprising:
creating the knowledge base.

16. An article of manufacture comprising:
a non-transitory storage medium storing instructions that, if executed by a processor-based system, enable the processor-based system to perform operations comprising:
accessing a database that includes a rule set formulated from at least one requirement, wherein the database includes a knowledge base;
accepting input regarding circumstance data, the circumstance data regarding a subject of the at least one requirement;
automatically applying the rule set to the input regarding circumstance data; and
automatically generating a compliance audit report based on applying the rule set to the input regarding circumstance data;
wherein the circumstance data comprises:
product class data to identify a general class of products for an item of manufacture; and
at least one item from the group consisting of:
product type data to identify a more specific type of product, within the general class of products, for the item of manufacture;
product attribute data to identify a property of the item of manufacture; and
customer data to identify a type of customer for the item of manufacture.

17. The article of claim 16, wherein the instructions further enable the processor-based system to create the knowledge base.

18. A system for conducting a compliance audit, the system comprising:
at least one first processor and at least one first memory operably coupleable to the at least one first processor, the first processor and the first memory operable to access a database, wherein the database includes a knowledge base, the knowledge base including a rule set, the rule set including rules formulated from at least one requirement;
an interface operable to accept input regarding circumstance data, the interface for accepting input regarding circumstance data operably coupleable to the at least one first processor and to the at least one first memory, the circumstance data regarding a subject of the at least one requirement;
at least one second processor and at least one second memory, the at least one second processor operably coupleable to the interface for accepting input regarding circumstance data, the at least one second processor and the at least one second memory operable to apply the rule set to the input regarding circumstance data; and
at least one third processor and at least one third memory, the at least one third processor and at least one third memory operable to generate a compliance audit, the at least one third processor and the at least one third memory operably coupleable to the at least one second processor for applying the rule set to the input regarding circumstance data, the compliance audit based on an application of the rule set to the input regarding circumstance data;
wherein the circumstance data comprises:
product class data to identify a general class of products for an item of manufacture; and at least one item from the group consisting of:
- product type data to identify a more specific type of product, within the general class of products, for the item of manufacture;
- product attribute data to identify a property of the item of manufacture; and
- customer data to identify a type of customer for the item of manufacture.

19. The system of claim 18, wherein the at least one first processor and at least one first memory operably coupleable to the at least one first processor, the first processor and the first memory operable to access a database, wherein the database includes a knowledge base, the knowledge base including a rule set, the rule set including rules formulated from at least one requirement, further comprises:
the at least one first processor and at least one first memory operably coupleable to the at least one first processor, the first processor and the first memory operable to access a database, wherein the database includes a knowledge base, the knowledge base including a rule set, the rule set including rules formulated from at least one requirement, wherein the at least one requirement includes a regulatory provision.

20. The system of claim 18, wherein the at least one first processor and at least one first memory operably coupleable to the at least one first processor, the first processor and the first memory operable to access a database, wherein the database includes a knowledge base, the knowledge base including a rule set, the rule set including rules formulated from at least one requirement, further comprises:
the at least one first processor and at least one first memory operably coupleable to the at least one first processor, the first processor and the first memory operable to access a database, wherein the database includes a knowledge base, the knowledge base including a rule set, the rule set including rules formulated from at least one requirement, wherein the at least one requirement includes a standard provision.

21. The system of claim 18, wherein the at least one first processor and at least one first memory operably coupleable to the at least one first processor, the first processor and the first memory operable to access a database, wherein the database includes a knowledge base, the knowledge base including a rule set, the rule set including rules formulated from at least one requirement, further comprises:
the at least one first processor and at least one first memory operably coupleable to the at least one first processor, the first processor and the first memory operable to access a database, wherein the database includes a knowledge base, the knowledge base including a rule set, the rule set including rules formulated from at least one requirement, wherein the at least one requirement includes a private rule provision.

22. The system of claim 18, wherein the interface operable to accept input regarding circumstance data, the interface for accepting input regarding circumstance data operably coupleable to the at least one first processor and to the at least one first memory, the circumstance data regarding a subject of the at least one requirement, further comprises:
the interface operable to accept input regarding circumstance data, the interface for accepting input regarding circumstance data operably coupleable to the at least one first processor and to the at least one first memory, the circumstance data regarding a subject of the at least one requirement, wherein the at least one requirement includes a regulatory provision.

23. The system of claim 18, wherein the accepting input regarding circumstance data, the circumstance data regarding a subject of the at least one requirement, further comprises:
the accepting input regarding circumstance data, the circumstance data regarding a subject of the at least one requirement, wherein the at least one requirement includes a standard provision.

24. The system of claim 18, wherein the accepting input regarding circumstance data, the circumstance data regarding a subject of the at least one requirement, further comprises:
the accepting input regarding circumstance data, the circumstance data regarding a subject of the at least one requirement, wherein the at least one requirement includes a private rule provision.

25. The system of claim 18, wherein the at least one first processor includes a knowledge base processor.

26. The system of claim 18, wherein the at least one first memory includes a knowledge base memory.

27. The system of claim 18, wherein the at least one second processor includes an application processor.

28. The system of claim 18, wherein the at least one second memory includes an application memory.

29. The system of claim 18, wherein the at least one third processor includes an audit processor.

30. The system of claim 18, wherein the at least one third memory includes an audit memory.

31. The system of claim 18, further comprising:
the knowledge base.

* * * * *